(12) United States Patent
Akiyama et al.

(10) Patent No.: US 7,677,818 B2
(45) Date of Patent: Mar. 16, 2010

(54) CAMERA TO WHICH PLURALITY OF TYPES OF PHOTOGRAPHING LENSES OR ACCESSORIES CAN BE DETACHABLY ATTACHED, AND CONTROL METHOD OF THE CAMERA

(75) Inventors: Hiroyoshi Akiyama, Inagi (JP); Yoichi Ito, Sagamihara (JP); Takeshi Kindaichi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 617 days.

(21) Appl. No.: 11/588,766

(22) Filed: Oct. 27, 2006

(65) Prior Publication Data

US 2007/0104481 A1 May 10, 2007

(30) Foreign Application Priority Data

Nov. 4, 2005 (JP) .............................. 2005-321056

(51) Int. Cl.
G03B 17/00 (2006.01)
G03B 7/26 (2006.01)
G03B 11/00 (2006.01)
H04N 5/76 (2006.01)

(52) U.S. Cl. ........................ 396/529; 396/301; 396/544; 348/231.99

(58) Field of Classification Search ................. 396/301, 396/529, 530, 532, 544; 348/207.1, 231.7, 348/231.99, 231.3, 231.6, 360
See application file for complete search history.

(56) References Cited

U.S. PATENT DOCUMENTS

| 4,509,842 | A |   | 4/1985  | Taniguchi et al. |
| 4,833,498 | A |   | 5/1989  | Kato et al. |
| 4,851,897 | A |   | 7/1989  | Inuma et al. |
| 4,855,814 | A |   | 8/1989  | Shiraishi et al. |
| 4,985,726 | A |   | 1/1991  | Fujibayashi et al. |
| 5,161,026 | A |   | 11/1992 | Mabuchi et al. |
| 5,402,174 | A |   | 3/1995  | Takahashi |
| 5,434,637 | A | * | 7/1995  | Ohta .......................... 396/529 |
| 5,903,000 | A | * | 5/1999  | Juniman ................. 250/231.13 |
| 7,394,370 | B2 | * | 7/2008 | Chan ....................... 340/572.1 |
| 2007/0104474 | A1 | * | 5/2007 | Tamura ....................... 396/91 |

FOREIGN PATENT DOCUMENTS

| JP | 05-59411   | 8/1993  |
| JP | 08-095144  | 4/1996  |
| JP | 2868226    | 12/1998 |

\* cited by examiner

*Primary Examiner*—W. B. Perkey
*Assistant Examiner*—Minh Q Phan
(74) *Attorney, Agent, or Firm*—Straub & Pokotylo; John C. Pokotylo

(57) ABSTRACT

In a main body of a camera, a recording unit is disposed which is capable of recording specific information of a photographing lens or an accessory. When the specific information of the presently attached photographing lens or accessory has been already registered in the recording unit, the main body of the camera does not acquire all the specific information from the attached photographing lens or accessory by data communication. In a case where the specific information of the attached photographing lens or accessory has been registered in the recording unit, the only identification information of the interchangeable lens or accessory can be enough, even if the data communication is necessary. In consequence, a communication time with respect to the interchangeable lenses or various types of accessories can be reduced as a whole.

17 Claims, 25 Drawing Sheets

CAMERA TO WHICH PLURALITY OF TYPES OF PHOTOGRAPHING LENSES OR ACCESSORIES CAN BE DETACHABLY ATTACHED, AND CONTROL METHOD OF THE CAMERA

CROSS-REFERENCE TO RELATED APPLICATION

This application is based upon and claims the benefit of priority from prior Japanese Patent Application No. 2005-321056, filed on Nov. 4, 2005, the entire contents of which are incorporated herein by reference.

BACKGROUND OF THE INVENTION

1. Field of the Invention

The present invention relates to a camera, more particularly to a camera system to which interchangeable lenses or accessories can be detachably attached.

2. Description of the Related Art

In a camera system to which interchangeable lenses or accessories can be detachably attached, the camera main body generally performs various calculations and controls based on information from the interchangeable lenses or the camera accessories.

For example, in Japanese Patent Publication No. 5-59411, a technology is disclosed in which various types of data required for an automatic focus operation or an exposure operation are stored beforehand in a ROM of a lens. When the camera main body is operated, the camera main body communicates with the interchangeable lens to read out the data stored in the ROM.

Moreover, in Japanese Patent No. 2868226, a technology is disclosed in which all the data stored in an interchangeable lens are read out to memorize the data in memory means in a camera main body at a time when the interchangeable lens is attached or a power supply is turned on.

BRIEF SUMMARY OF THE INVENTION

In a camera of the present invention, a recording unit capable of recording specific information of a photographing lens or an accessory is provided in the camera main body. It is configured such that when the specific information of the currently attached photographing lens or accessory has been already registered in the recording unit, the camera main body does not acquire all the specific information from the photographing lens or the accessory by data communication. This is because, in a case where the specific information of the currently attached photographing lens or accessory has been registered in the recording unit of the camera main body, even if the data communication is necessary, only identification information of the interchangeable lens or accessory may be enough. In consequence, a communication time with respect to the interchangeable lenses or various types of accessories can be reduced as a whole.

One example of a constitution of the camera of the present invention is as follows. A camera to which a plurality of types of photographing lenses or accessories can be detachably attached, comprising: a storage unit capable of registering one or more pieces of specific information of the photographing lenses or the accessories; a judgment unit which judges, at a predetermined timing including a time when a photographing lens or accessory is attached to the camera main body, whether or not the specific information of the attached photographing lens or accessory has been registered in the storage unit; a registration unit, when the judgment unit judges that the specific information of the attached photographing lens or accessory has not been registered in the storage unit, which acquires the specific information of the attached photographing lens or the accessory from the attached photographing lens or the accessory to register the acquired specific information in the storage unit; and a control unit which controls an operation of the camera in accordance with the specific information registered in the storage unit.

The present invention can be understood as the invention of a method.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

First Embodiment

Figure 1:
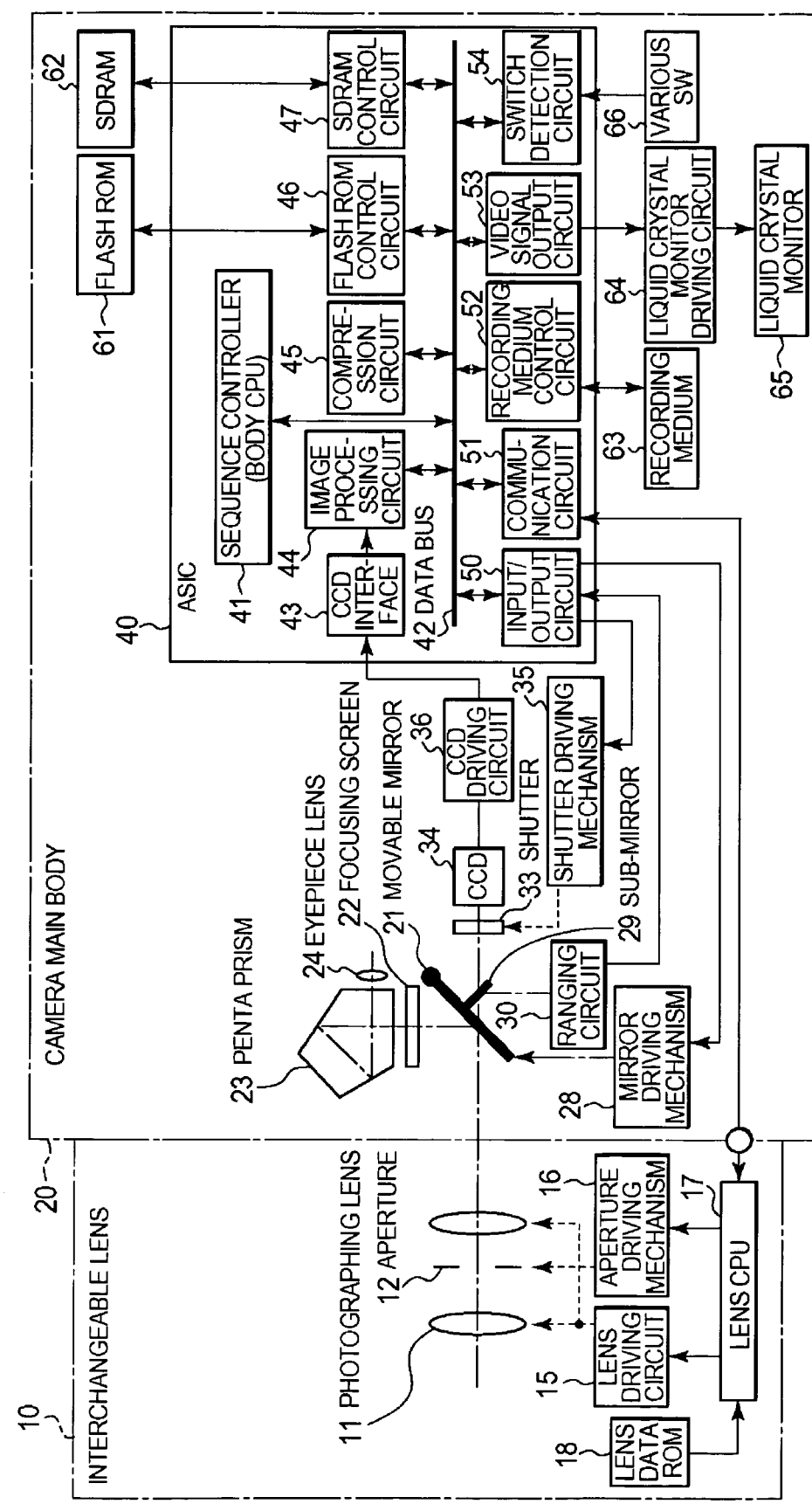
FIG. 1 is a block diagram showing an electric circuit constitution of a digital camera in a first embodiment of the present invention.

FIG. 1 is a block diagram showing an electric circuit constitution of a digital camera in a first embodiment of the present invention.

The present digital camera (hereinafter referred to simply as the camera) has a camera main body 20 and an interchangeable lens 10 which is detachably attached to a front part of this camera main body 20.

The lens barrel 10 has a photographing lens 11, an aperture 12, a lens driving circuit 15, an aperture driving mechanism 16, a lens CPU 17 and a lens data ROM 18.

The photographing lens 11 has a plurality of lenses such as a focusing lens and a zooming lens, and allows an image (subject image) of a subject (not shown) to enter the camera main body 20. The aperture 12 adjusts a quantity of light of the subject image which is to enter the camera main body 20. The lens driving circuit 15 performs focus adjustment driving or magnification change driving of the photographing lens 11 based on a control of the lens CPU 17. The aperture driving mechanism 16 opens or closes the aperture 12 based on the control of the lens CPU 17.

As described above, the lens CPU 17 controls units such as the lens driving circuit 15 and the aperture driving mechanism 16 in the lens barrel 10. Furthermore, the lens CPU 17 is constituted to be communicable with a camera control circuit 40 described later in the camera main body 20. In the lens data ROM 18, there are stored data specific to the interchangeable lens 10 such as data of a type of the lens, an aperture stop value and a focal length. The specific data are transmitted through the lens CPU 17 to the camera control circuit 40 by communication.

On the other hand, the camera main body 20 is constituted as follows:

The subject image which has entered the camera main body 20 via the photographing lens 11 and the aperture 12 of the lens barrel 10 is reflected by a movable mirror 21, and converged on a focusing screen 22 to enter an eyepiece lens 24 via a penta prism 23. Accordingly, a photographer can observe the subject image.

The movable mirror 21 is driven by a mirror driving mechanism 28 to be movable between a subject observing position (state of FIG. 1) and a retreated position (not shown). A part of the movable mirror 21 is constituted of a half mirror. The subject image which has passed through this half mirror portion is reflected by a sub-mirror 29 disposed on the backside of the movable mirror 21, and guided to a ranging circuit 30 which performs automatic ranging.

Furthermore, a shutter 33 and a CCD 34 as an image sensor are arranged behind the movable mirror 21 along the optical axis. The shutter 33 is a focal plane type of shutter constituted of, for example, a front curtain and a rear curtain. The shutter 33 shields or exposes an image pickup surface of the CCD 34 to thereby adjust an incidence amount of the subject image on the image pickup surface. Moreover, this shutter 33 is opened or closed by a shutter driving mechanism 35 under the control of the camera control circuit 40.

The CCD 34 performs an image pickup operation to convert the subject image struck via the shutter 33 into an electric signal. Moreover, the electric signal converted by this CCD 34 is read out as an image signal by a CCD driving circuit 36, and output to a CCD interface 43 described later in the camera control circuit 40.

Next, the camera control circuit 40 will be described.

The camera control circuit 40 is constituted of an application specific integrated circuit (hereinafter abbreviated as ASIC) so as to generally execute various types of processing in the camera main body 20. In this ASIC 40, a sequence controller (body CPU) 41 is disposed. The sequence controller 41 is a control circuit (control unit) which controls circuits in the ASIC 40 and which performs various types of calculations such as photometry calculation and ranging calculation. This control circuit 40 operates as a judgment unit having a judging function and a registration unit having a registering function in a flow described later.

Moreover, this sequence controller 41 is connected to a data bus 42 which is a transfer path for transferring various types of processing data in the ASIC 40 to units of the ASIC 40. Furthermore, the sequence controller 41 is connected via the data bus 42 to the CCD interface 43, an image processing circuit 44, a compression circuit 45, a flash ROM control circuit 46, an SDRAM control circuit 47, an input/output circuit 50, a communication circuit 51, a recording medium control circuit 52, a video signal output circuit 53 and a switch detection circuit 54.

The CCD interface 43 subjects the image signal read from the CCD 34 via the CCD driving circuit 36 to analog processing such as noise removal, amplification or waveform shaping. Moreover, the CCD interface 43 converts the analog image signal subjected to the processing into a digital signal to produce image pickup data, and outputs this image pickup data to the image processing circuit 44.

The image processing circuit 44 subjects the image pickup data produced in the CCD interface 43 to various types of image processing such as white balance correction, gamma ($\gamma$) correction and color correction in order to record the image.

The compression circuit 45 compresses the image pickup data processed by the image processing circuit 44 or extends compressed image pickup data in a format such as JPEG format.

The flash ROM control circuit 46 performs writing address controls in writing data in a flash ROM 61 as a storage unit, and performs readout address controls in reading the data from the flash ROM 61. It is to be noted that in the flash ROM 61, there are stored various programs to be executed by the sequence controller 41 and various adjustment values concerning the camera main body 20.

The SDRAM control circuit 47 performs write address controls in writing the data in an SDRAM 62 as a storage unit, and performs readout address controls in reading the data from the SDRAM 62. In the SDRAM 62, there are temporarily stored the image pickup data processed by the image processing circuit 44 and various types of data such as outputs of the ranging circuit 30 and a photometry unit (not shown). It is to be noted that the SDRAM 62 as a volatile memory can operate at a speed which is higher than that of the flash ROM 61 as a nonvolatile memory.

The input/output circuit 50 is an interface circuit of the ASIC 40 for transmitting or receiving a signal with respect to the mirror driving mechanism 28, the ranging circuit 30 and the shutter driving mechanism 35 which are connected to the ASIC 40. The communication circuit 51 is a communication interface circuit for communication to be performed between the ASIC 40 and the lens CPU 17 of the interchangeable lens 10.

The recording medium control circuit 52 performs write address controls in writing the image pickup data compressed by the compression circuit 45 in a recording medium 63, and performs readout address controls in reading the compressed data from the recording medium 63. The recording medium 63 is a memory card or the like to be detachably attached to, for example, the camera main body 20, and the image pickup data compressed by the compression circuit 45 is recorded therein.

The video signal output circuit 53 converts the image pickup data or the like processed by the image processing circuit 44 into a signal suitable for display to output the signal to a liquid crystal monitor driving circuit 64. This liquid crystal monitor driving circuit 64 displays the image on a liquid crystal monitor 65 based on the signal input from the video signal output circuit 53.

Furthermore, the switch detection circuit 54 detects on-states and off-states of various switches (SW) 66, and outputs a signal corresponding to the state of the switch. The switches 66 are operation members such as a power switch, a release switch, a menu switch and a mode change switch described later (not shown), and are turned on or off by operation with the operation members.

In the camera constituted in this manner, the image of the subject (not shown) struck from the photographing lens 11 of the interchangeable lens 10 is guided into the camera main body 20 via the aperture 12. The subject image guided into the camera main body 20 is reflected by the movable mirror 21, and converged on the focusing screen 22. Thereafter, the image reaches a photographer eye (not shown) via the penta prism 23 and the eyepiece lens 24.

Moreover, the subject image transmitted through a half mirror portion of the movable mirror 21 is reflected by the sub-mirror 29, and guided into the ranging circuit 30. In accordance with a ranging result of this ranging circuit 30, a lens driving amount required for focus adjustment is calculated based on a focus deviation amount by the sequence controller 41 of the ASIC 40 and the lens CPU 17 of the interchangeable lens 10. Moreover, based on this driving amount of the lens, the photographing lens 11 is driven in an optical axis direction via the lens driving circuit 15. Moreover, results obtained by a photometry unit (not shown) are similarly reflected in an aperture driving mechanism via the sequence controller 41 and the lens CPU 17, whereby the aperture 12 is narrowed. The above-described ranging and photometry processing operations are performed, when a first release switch (not shown) is turned on among the switches 66.

Furthermore, when a second release switch (not shown) is turned on among the switches 66, the movable mirror 21 and the sub-mirror 29 positioned in an observing position are moved (mirror up) to a retreated position (not shown) by the mirror driving mechanism 28. In this state, the subject image is taken into the CCD 34 in accordance with an opening/closing time of the shutter 33, subjected to the image processing by the image processing circuit 44, and further stored in the SDRAM 62 via the SDRAM control circuit 47. Thereafter, the aperture 12 is opened, and the movable mirror 21 and the sub-mirror 29 are moved (mirror down) to the observing position.

It is to be noted that image data stored in the SDRAM 62 can be displayed in the liquid crystal monitor 65, and written in the recording medium 63.

Next, with reference to FIGS. 2 and 3, there will be described communication between the interchangeable lens 10 and the camera main body 20 at a time when a power source is turned on or the lens is attached in the first embodiment of the present invention.

Figure 2:
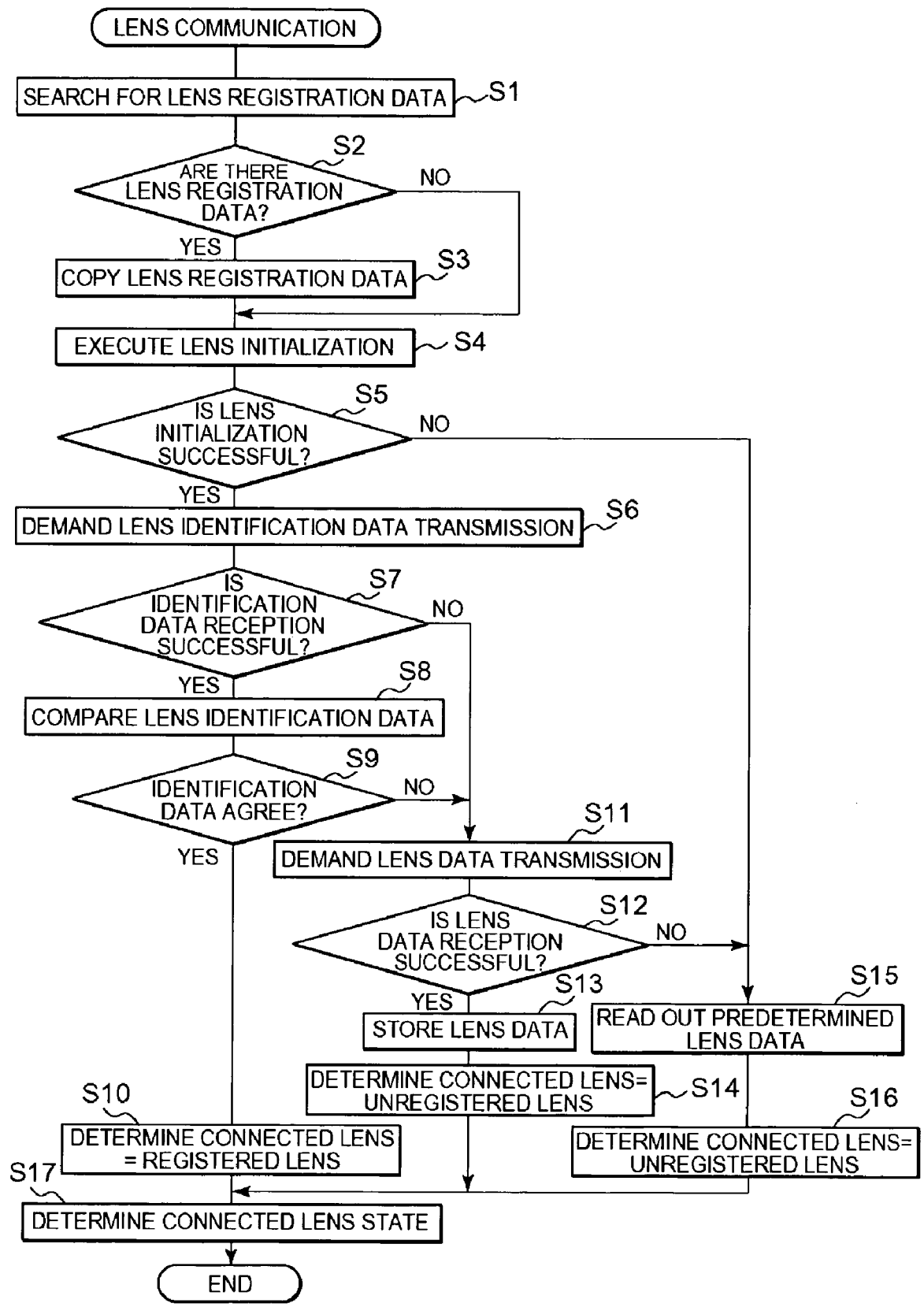
FIG. 2 is a flow chart showing an operation of lens communication at a time when a power source is turned on or a lens is attached in the first embodiment of the present invention.

FIG. 2 is a flow chart showing an operation of lens communication at the time when the power source is turned on or the lens is attached in the first embodiment of the present invention. FIG. 3 is an explanatory view showing a flow of data between the flash ROM 61 and the SDRAM 62 in the camera main body 20. It is to be noted that the operation of the lens communication is performed mainly under the control of the sequence controller 41.

In a case where the interchangeable lens 10 is attached to the camera main body 20 and the power source is turned on, or the interchangeable lens 10 is attached to the camera main body 20 in a state in which the power source has been turned on, the present operation of the lens communication is called from a main sequence of a well-known camera, and started.

First in step S1, the flash ROM 61 of the camera main body 20 is searched for lens registration data 101. Subsequently, it is judged in step S2 whether or not there are the lens registration data 101.

When the lens registration data 101 is present in the flash ROM 61, the operation shifts to step S3 to copy the lens registration data 101 to a lens data region 102 of the SDRAM 62 (a1). On the other hand, in a case where it is judged in the step S2 that there is not any lens registration data 101, the step S3 is skipped.

In step S4, initialization of the interchangeable lens 10 attached to the camera main body 20 is executed. Moreover, it is judged in step S5 whether or not the initialization of the interchangeable lens 10 was successful. Here, if the initialization was successful, the operation shifts to step S6. If not, the operation shifts to step S15 described later.

In step S6, the transmission of lens identification data from the interchangeable lens 10 is demanded by the sequence controller 41. This lens identification data are minimum lens data prepared beforehand for judgment of the interchangeable lens. Next, it is judged in step S7 whether or not reception of the identification data was successful. As a result, if the reception was successful, the operation shifts to step S8. If not, the operation shifts to step S11 described later.

In the step S8, the received lens identification data are compared with the lens registration data copied in the step S3. Moreover, it is judged in step S9 whether or not the both identification data compared in the step S8 matched. Here, if the both identification data matched, the operation shifts to step S10 to judge that the interchangeable lens 10 (connected lens) attached to the camera main body 20 is a lens already registered in the flash ROM 61.

The operation shifts to step S11, in both of a case where it is judged in the step S7 that the reception of the identification data fails and a case where it is judged in the step S9 that the identification data does not match the registration data. In this step S11, the interchangeable lens 10 is demanded by the sequence controller 41 to transmit all the lens data that is specific information of the photographing lens 10 stored in the lens data ROM 18. Next, it is judged in step S12 whether or not the reception of all the data of the interchangeable lens 10 was successful.

Here, when the reception of all the data of the interchangeable lens 10 was successful, the operation shifts to step S13 to store all the lens data of the interchangeable lens 10 in the SDRAM 62. Further in step S14, it is judged that the interchangeable lens 10 attached to the camera main body 20 is an unregistered lens. When it is judged in the step S12 that the reception of the lens data failed, the operation shifts to the step S15.

In the step S15, predetermined lens data set beforehand is read out by the SDRAM 62, in a case where it was judged in the step S5 that the initialization of the lens fails, or it was judged in the step S12 that the reception of the lens data failed. Thereafter, in step S16, it is judged that the interchangeable lens 10 attached to the camera main body 20 is an unregistered lens or any interchangeable lens 10 is not attached.

Moreover, after a processing operation of any of the steps S10, S14 and S16 is performed, the operation shifts to step S17 to determine a state of the interchangeable lens 10 presently attached to the camera main body 20. Thereafter, the present sequence ends.

Figure 3:
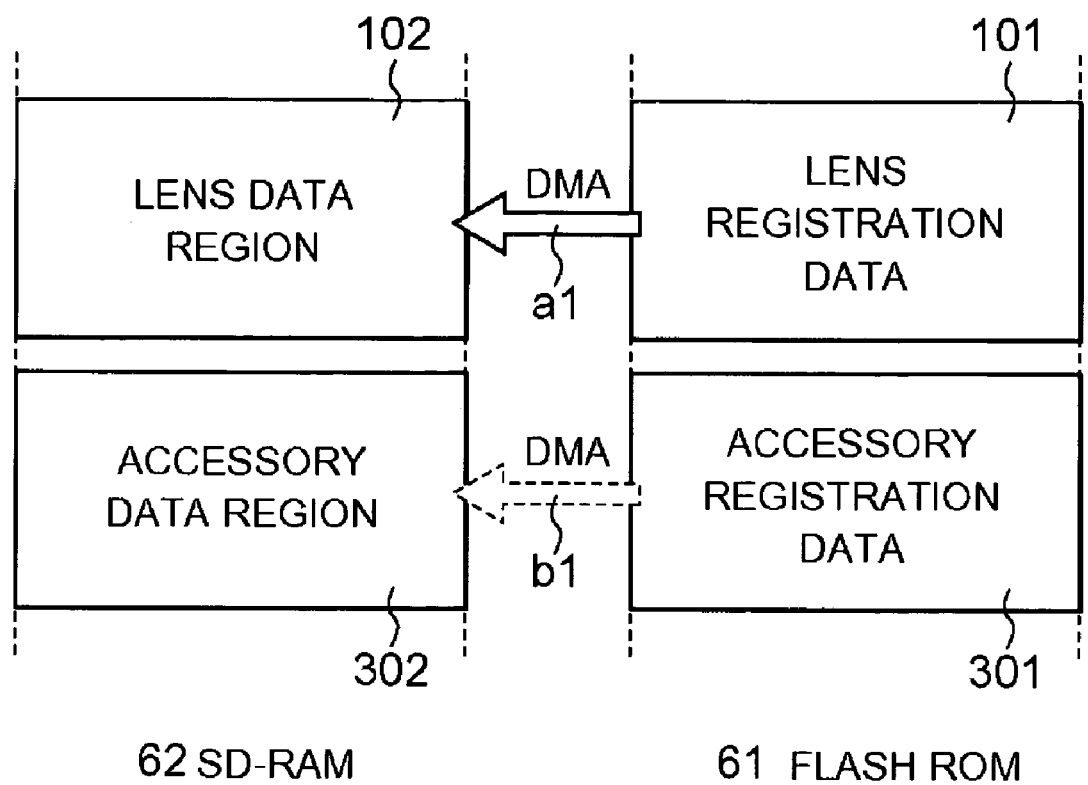
FIG. 3 is an explanatory view showing a flow of data between a flash ROM 61 and an SDRAM 62 in a camera main body 20 at a time when the power source is turned on in the first embodiment of the present invention.

It is to be noted that in FIG. 3, an operation of data communication of an accessory is similar to that of the communication of the lens data. Therefore, in FIG. 3, the reference numerals "101" and "102" of portions concerning the lens data are replaced with "301" and "302", the corresponding term "lens" is replaced with "accessory", "a1" indicating the flow is replaced with "b1", respectively, and the description thereof is omitted.

Next, with reference to FIGS. 4 and 5, there will be described communication between the interchangeable lens 10 and the camera main body 20 at a time when the power source is turned off in the first embodiment.

Figure 4:
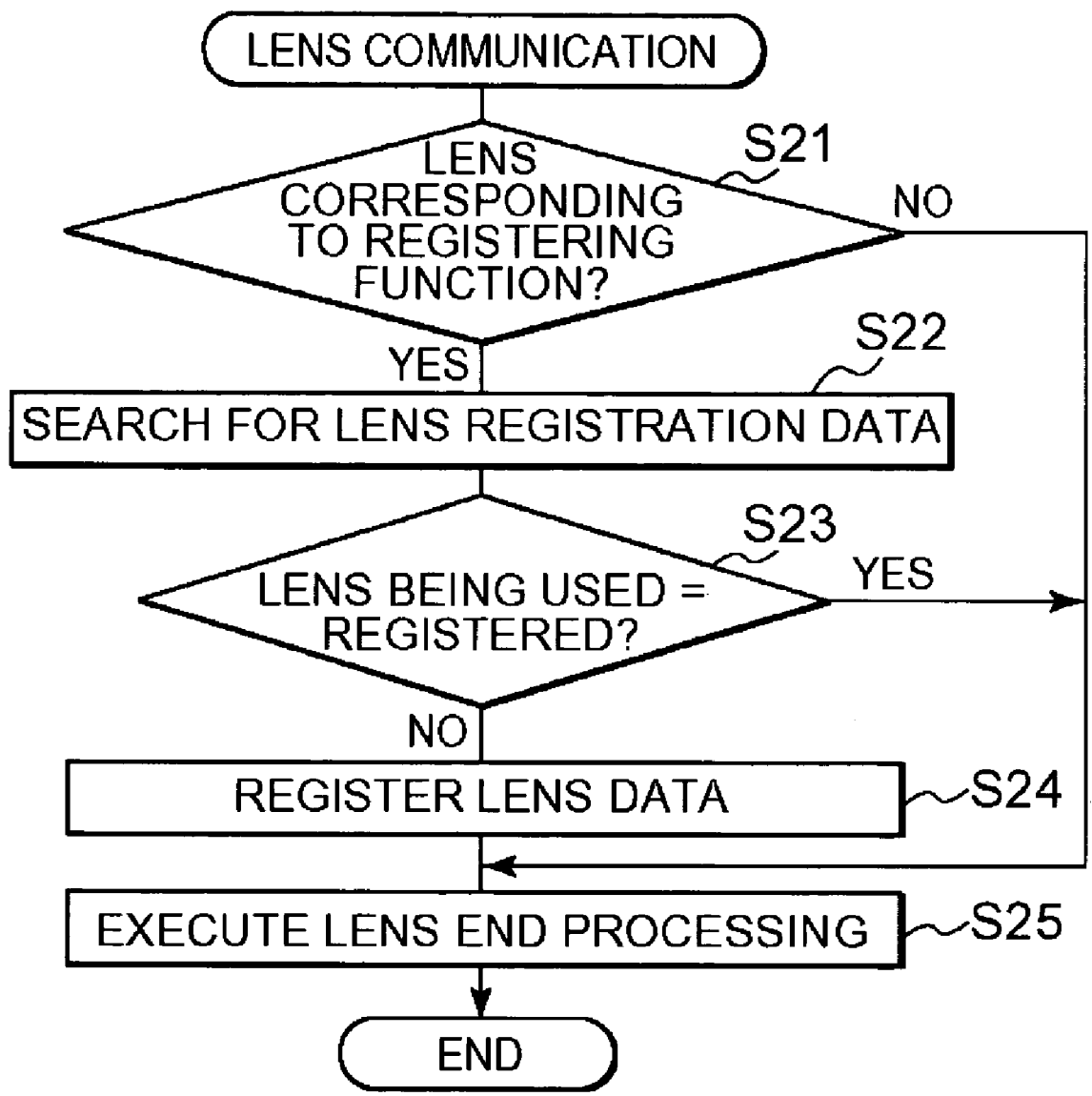
FIG. 4 is a flow chart showing an operation of lens communication at a time when the power source is turned off in the first embodiment.
Figure 5:
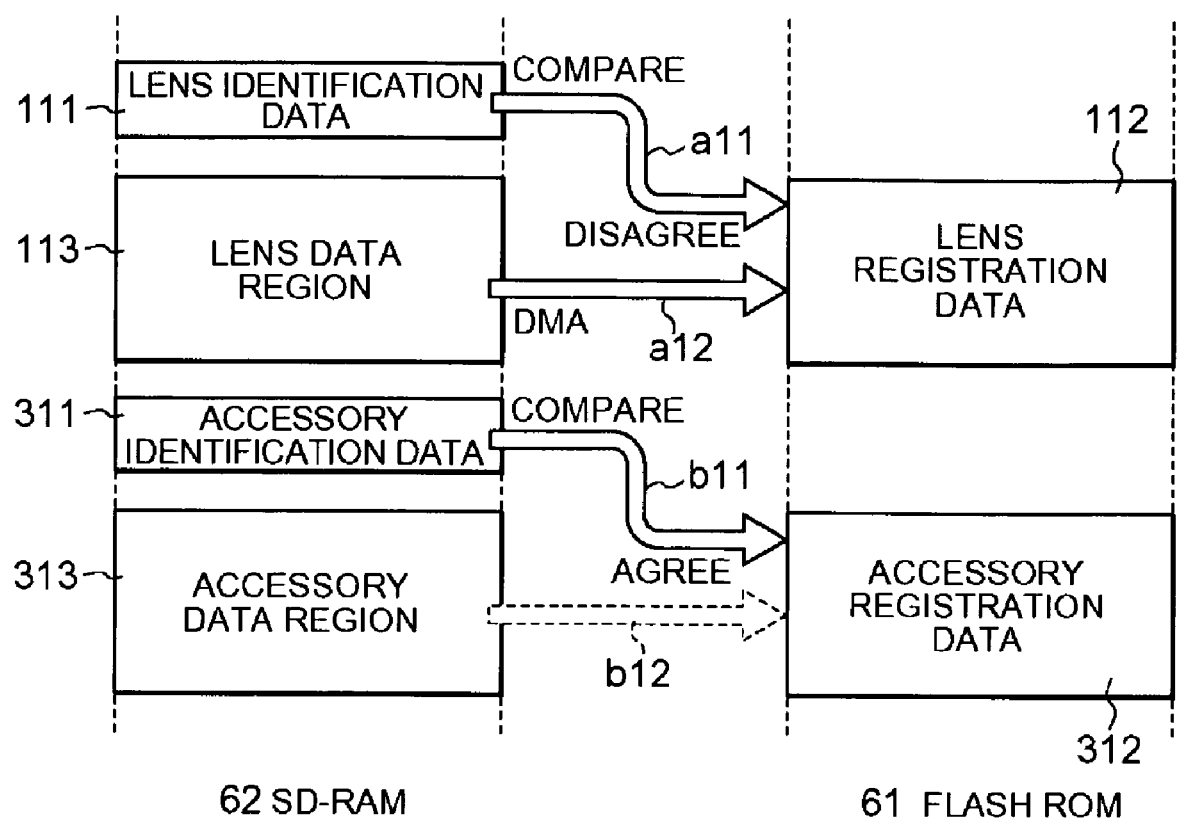
FIG. 5 is an explanatory view showing the flow of the data between the flash ROM 61 and the SDRAM 62 in the camera main body 20 at a time when the power source is turned off in the first embodiment.

FIG. 4 is a flow chart showing an operation of the lens communication at the time when the interchangeable lens is changed or the power source is turned off in the first embodiment, and FIG. 5 is an explanatory view showing the flow of the data between the flash ROM 61 and the SDRAM 62 in the camera main body 20. It is to be noted that the operation of the lens communication is performed mainly under the control of the sequence controller 41.

When the present sequence is started, first in step S21, it is judged whether or not the interchangeable lens 10 attached to the camera main body 20 is a lens corresponding to a registering function. Here, if the lens corresponds to the registering function, the operation shifts to step S22. If not, the operation shifts to step S25 described later.

In the step S22, the flash ROM 61 is searched for the lens registration data. Next, in step S23, lens identification data 111 is compared with lens registration data 112 to judge whether or not the interchangeable lens 10 being used has been registered (a11). Here, when the attached interchangeable lens 10 is not registered (disagreement), the operation shifts to step S24 to register lens data stored in a lens data region 113 of the SDRAM 62 as the lens registration data 112 to the flash ROM 61 (a12). On the other hand, in a case where it is judged in the step S23 that the lens has already been registered, it is not necessary to register any lens data. Therefore, the step S24 is skipped to shift to the step S25.

In the step S25, the termination process of the above-described lens end processing is executed. Moreover, the present sequence ends.

It is to be noted that in FIG. 5, an operation of data communication of the accessory is similar to that of the communication of the lens data. Therefore, in FIG. 5, the reference numerals "111" to "113" of the portions concerning the lens data are replaced with "311" to "313", the corresponding term "lens" is replaced with "accessory", "a11", "a12" indicating the flow are replaced with "b11", "b12", respectively, and the description thereof is omitted.

Thus, according to the first embodiment, the camera main body 20 includes the flash ROM 61 which is a nonvolatile recording medium capable of registering the data of the interchangeable lens or the accessory, and the SDRAM 62 which is a volatile memory operating at a speed higher than that of the flash ROM 61. Moreover, when the power source is turned on, or the interchangeable lens 10 is attached, the data registered in the flash ROM 61 is copied in the SDRAM 62. Therefore, when the interchangeable lens 10 (or the accessory) is registered beforehand in the flash ROM 61, all the data does not have to be transferred from the interchangeable lens 10 (or the accessory) to the camera main body 20.

Moreover, when the interchangeable lens 10 (or the accessory) is identified, only identification data having a small data amount is transferred from the interchangeable lens 10 (or the accessory) to the camera main body 20 for judgment. Therefore, a communication load of the data is small.

Furthermore, in the only case where the reception of the identification data fails, or the identification data of the interchangeable lens 10 (or the accessory) does not agree with that copied in the SDRAM 62, all the data may be transferred from the interchangeable lens 10 (or the accessory) to the camera main body 20. Therefore, there are few opportunities to communicate a large amount of the data.

In addition, even if the initialization of the interchangeable lens 10 (or the accessory) fails, or the reception of all the data fails, the predetermined data are prepared, and the photographing is therefore possible.

Moreover, when the interchangeable lens 10 (or the accessory) is not registered, the data registered in the SDRAM 62 is also registered in the flash ROM 61. Therefore, the next transfer of all the data is not necessary.

In consequence, according to the first embodiment, since it is possible to reduce an initial communication time of the interchangeable lens, a starting time of the camera can be reduced.

Second Embodiment

Next, a second embodiment of the present invention will be described.

In the above first embodiment, all of the lens registration data are copied. In the second embodiment, however, there is copied only data concerning a performance of a camera such as automatic exposure (AE) or automatic focusing (AF). That is, as a usual data region, a storage region of a flash ROM 61 is used, and at a starting time, only data related to a photographing performance are copied in a high-speed SDRAM 62 and accessed.

Hereinafter, with reference to FIGS. 6 and 7, there will be described communication between an interchangeable lens 10 and a camera main body 20 at a time when a power source is turned on or the lens is attached in the second embodiment of the present invention.

Figure 6:
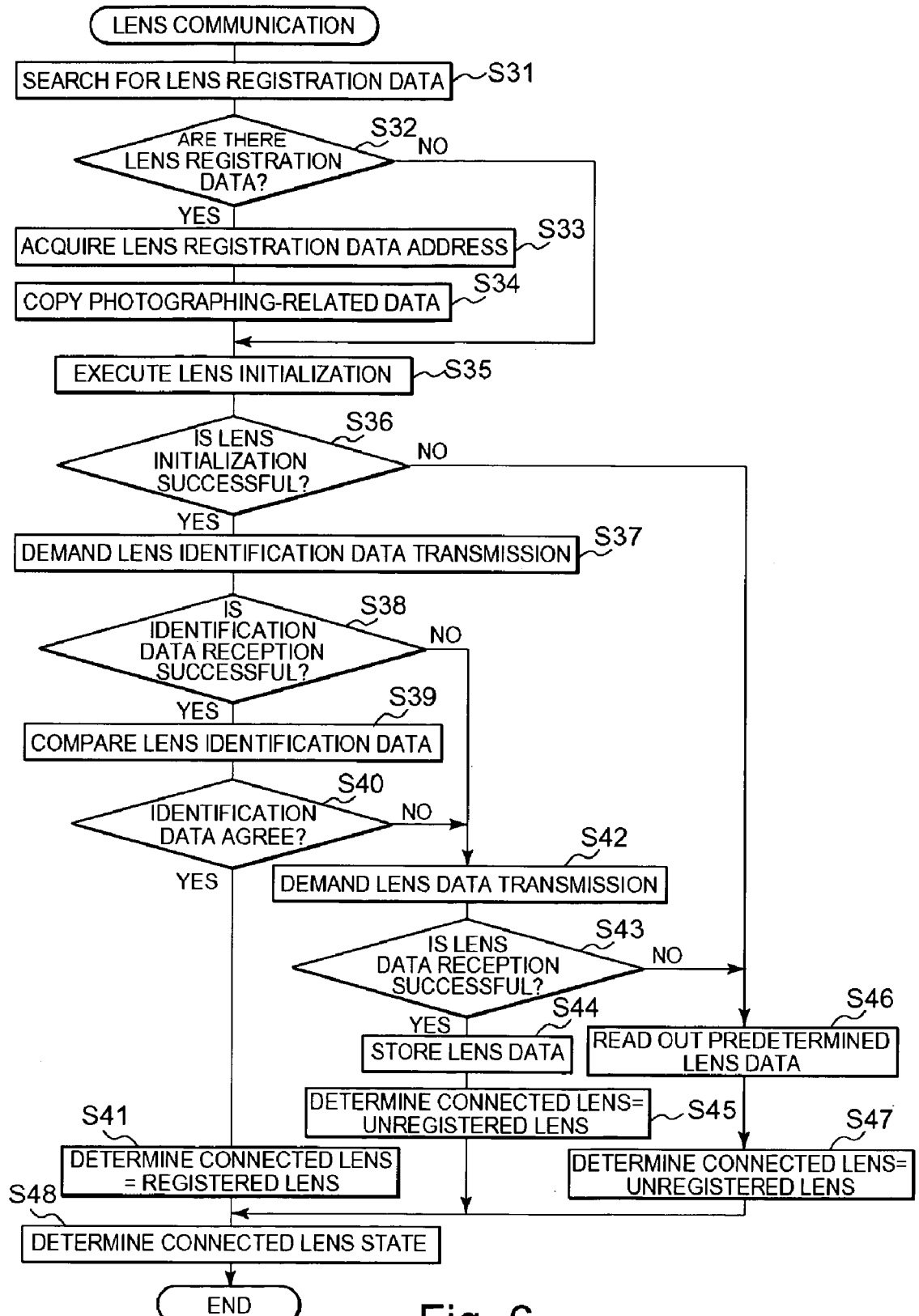
FIG. 6 is a flow chart showing an operation of lens communication at a time when a power source is turned on or a lens is attached in a second embodiment of the present invention.

FIG. 6 is a flowchart showing an operation of lens communication at the time when the power source is turned on or the lens is attached in the second embodiment of the present invention. FIG. 7 is an explanatory view showing a flow of data between the flash ROM 61 and the SDRAM 62 in the camera main body 20. It is to be noted that the operation of the lens communication is performed mainly under the control of a sequence controller 41.

When the present sequence is started, first in step S31, the flash ROM 61 of the camera main body 20 is searched for lens registration data 122. Next, it is judged in step S32 whether or not there are the lens registration data. Here, if the data are present in the flash ROM 61, the operation shifts to step S33, and an address of the lens registration data 122 is acquired by a lens data pointer 124 (a21). Subsequently, in step S34, only data (photographing-related data) 123 related to a photographing performance are copied in a lens data region 121 of the SDRAM 62 (a22). On the other hand, when there are not any lens registration data in the step S32, the steps S33 and S34 are skipped.

Hereinafter, since processing operations of steps S35 to S48 are the same as those of the steps S4 to S17 of the flow chart of FIG. 2 of the first embodiment, to avoid redundant description, it is assumed that the processing operations of the corresponding steps are performed, respectively, and the description thereof is omitted here.

Figure 7:
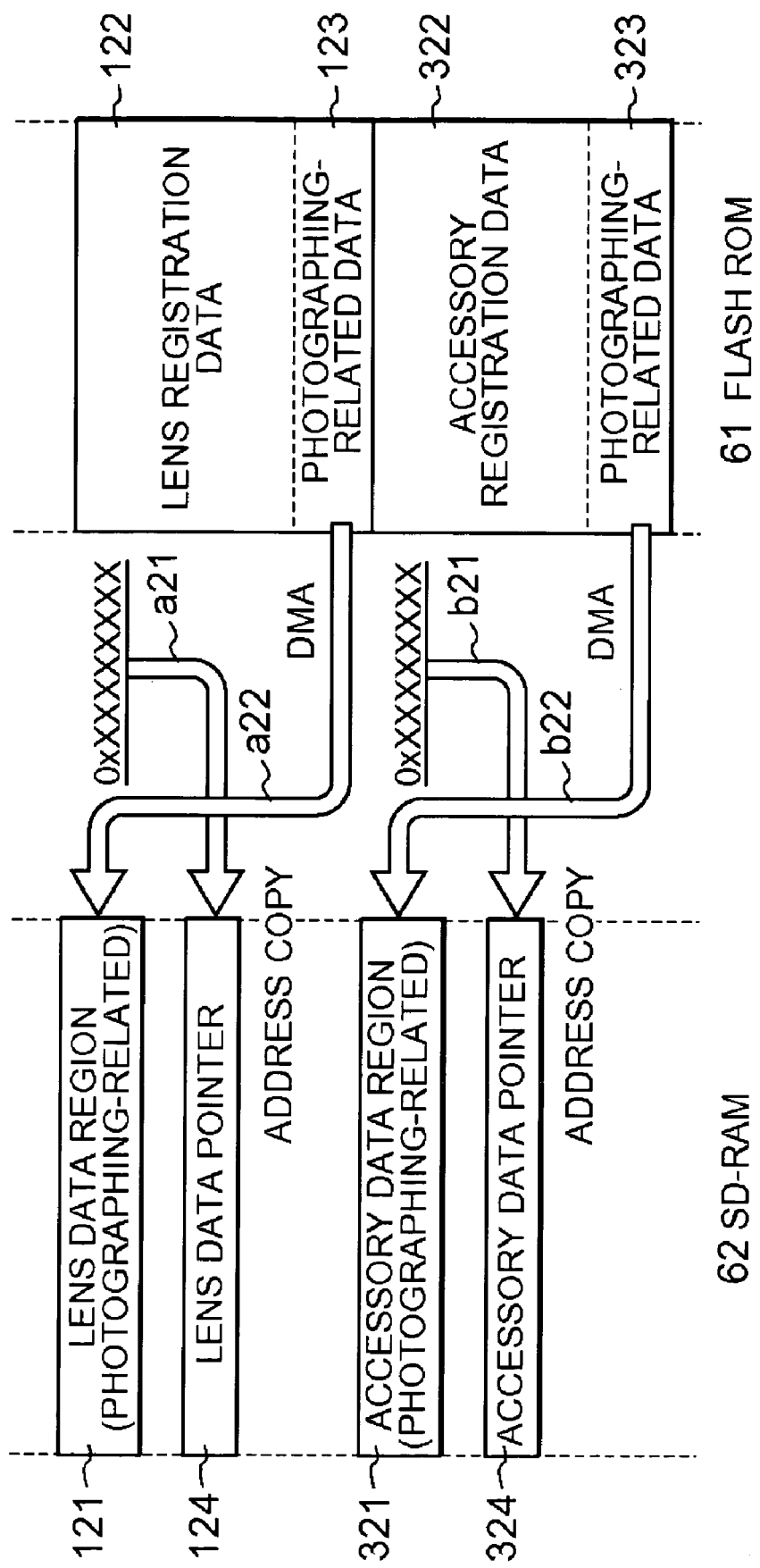
FIG. 7 is an explanatory view showing a flow of data between a flash ROM 61 and an SDRAM 62 in a camera main body 20 at a time when the power source is turned on or the lens is attached in the second embodiment of the present invention.

It is to be noted that in FIG. 7, an operation of data communication of an accessory is similar to that of the communication of the lens data. Therefore, in FIG. 7, the reference numerals "121" to "124" of portions concerning the lens data are replaced with "321" to "324", the corresponding term "lens" is replaced with "accessory", "a21", "a22" indicating the flow are replaced with "b21", "b22", respectively, and the description thereof is omitted.

Thus, according to the second embodiment, when the power source is turned on or the interchangeable lens 10 is attached, among the data registered in the flash ROM 61, the only data concerning a performance of the camera such as the automatic exposure (AE) or the automatic focusing (AF) is copied in the SDRAM 62. Therefore, an amount of the data to be copied is smaller than that of the first embodiment.

In consequence, according to the second embodiment, it is possible to reduce a time for starting the camera more than the first embodiment without influencing any photographing performance.

Third Embodiment

Next, a third embodiment of the present invention will be described.

In this third embodiment, initialization of a lens and communication processing are performed simultaneously with searching for registered data and copying of the data.

Hereinafter, with reference to FIG. 8, there will be described communication between an interchangeable lens 10 and a camera main body 20 at a time when a power source is turned on or the lens is attached in the third embodiment of the present invention.

Figure 8:
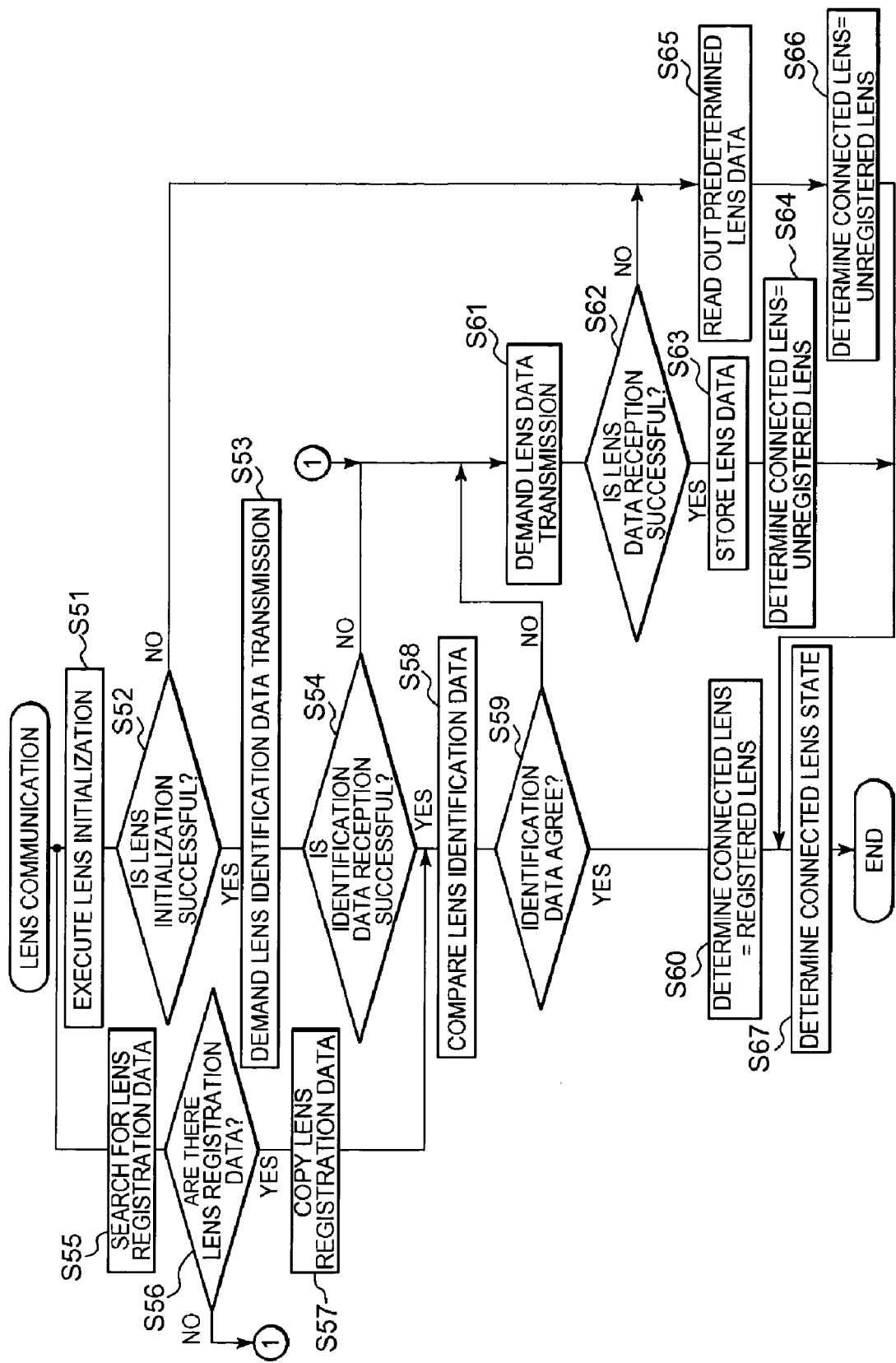
FIG. 8 is a flow chart showing an operation of lens communication at a time when a power source is turned on or a lens is attached in a third embodiment of the present invention.

FIG. 8 is a flow chart showing an operation of lens communication at the time when the power source is turned on or the lens is attached in the third embodiment of the present invention. It is to be noted that the operation of the lens communication is performed mainly under the control of a sequence controller 41.

When the present sequence is started, first in step S51, initialization of the interchangeable lens 10 attached to the camera main body 20 is executed. Moreover, it is judged in step S52 whether or not the initialization of the interchangeable lens 10 is successful. Here, if the initialization is successful, the operation shifts to step S53. If not, the operation shifts to step S65. In the step S53, transmission of the lens identification data from the interchangeable lens 10 is demanded by the sequence controller 41. Subsequently, it is judged in step S54 whether or not reception of the lens identification data was successful. As a result, if the reception was successful, the operation shifts to step S58. If not, the operation shifts to step S61.

Moreover, in parallel with the lens initialization, in step S55, a flash ROM 61 of the camera main body 20 is searched for lens registration data. Subsequently, it is judged in step S56 whether or not there are the lens registration data. Here, when the data are present in the flash ROM 61, the operation shifts to step S57. After the lens registration data are copied in a lens data region of an SDRAM 62, the operation shifts to the step S58. On the other hand, when it is judged in the step S56 that there are not any lens registration data, the operation shifts to the step S61.

Hereinafter, since processing operations of steps S59 to S67 are the same as those of the steps S9 to S17 of the flow chart of FIG. 2 of the first embodiment, to avoid redundant description, it is assumed that the processing operations of the corresponding steps are performed, respectively, and the description thereof is omitted here.

Thus, even according to the third embodiment, it is possible to reduce a time for starting the camera, because the initialization of the lens and the communication processing are performed simultaneously with the searching for the registered data and the copying of the data.

Fourth Embodiment

Next, with reference to FIGS. 9 and 10, there will be described communication between an interchangeable lens 10 and a camera main body 20 at a time when a power source is turned on or the lens is attached in a fourth embodiment of the present invention.

In the first embodiment, there has been described the example in which there are one data registration region of the interchangeable lens and one data registration region of an accessory, respectively. In this fourth embodiment, there will be described an example in which there are a plurality of (three in this case) data registration regions of each of the interchangeable lens and the accessory.

Figure 9:
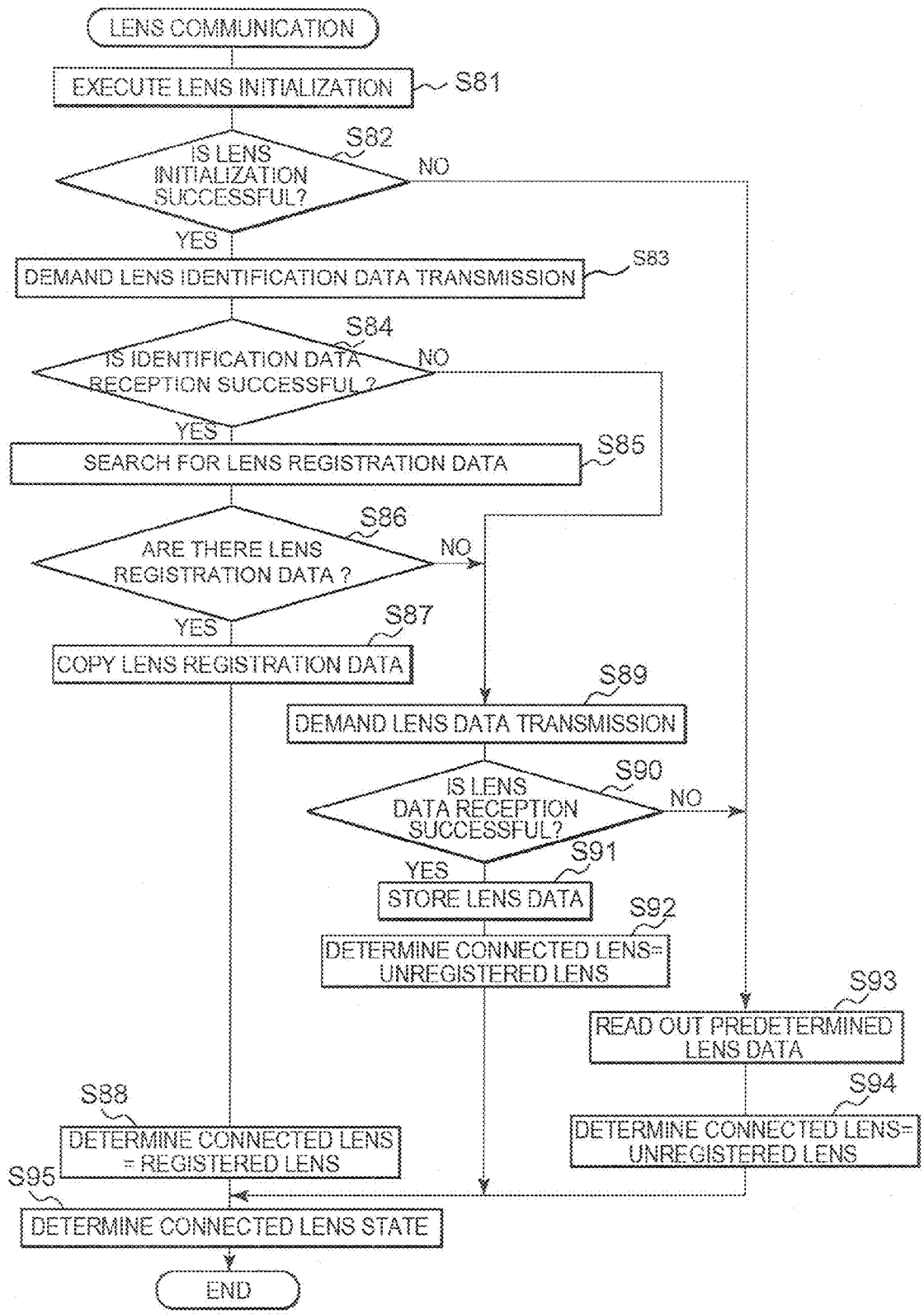
FIG. 9 is a flow chart showing an operation of lens communication at a time when a power source is turned on or a lens is attached in a fourth embodiment of the present invention.
Figure 10:
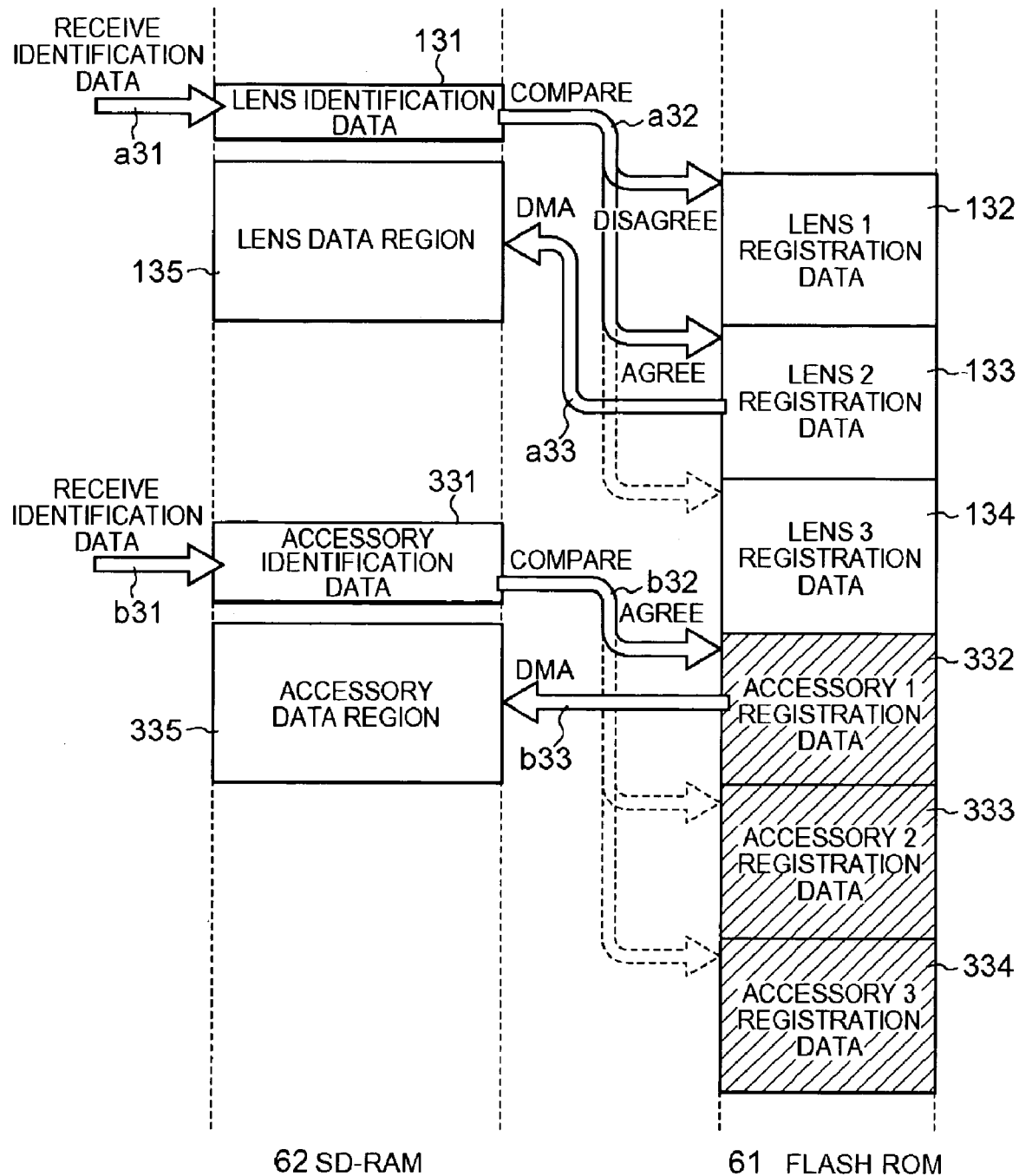
FIG. 10 is an explanatory view showing a flow of data between a flash ROM 61 and an SDRAM 62 in a camera main body 20 at a time when the power source is turned on or the lens is attached in the fourth embodiment of the present invention.

FIG. 9 is a flow chart showing an operation of lens communication at the time when the power source is turned on or the lens is attached in the fourth embodiment of the present invention, and FIG. 10 is an explanatory view showing a flow of data between a flash ROM 61 and an SDRAM 62 in the camera main body 20. It is to be noted that the operation of the lens communication is performed mainly under the control of the sequence controller 41.

When the present sequence is started, first in step S81, initialization of the interchangeable lens 10 attached to the camera main body 20 is executed. Subsequently, it is judged in step S82 whether or not the initialization of the interchangeable lens 10 is successful. Here, if the initialization is successful, the operation shifts to step S83. If not, the operation shifts to step S93. In the step S83, transmission of the lens identification data from the interchangeable lens 10 is demanded. Moreover, it is judged in step S84 whether or not reception of lens identification data 131 was successful. As a result, if the reception was successful (a31), the operation shifts to step S85. If not, the operation shifts to step S89.

In the step S85, the flash ROM 61 of the camera main body 20 is searched for a plurality of (three in this case) the lens 1 registration data 131 to lens 3 registration data 133 (a32). Next, it is judged in step S86 whether or not there are lens registration data corresponding to the interchangeable lens 10. Here, when the data are present in the flash ROM 61, the operation shifts to step S87 to copy the lens registration data in a lens data region 135 of the SDRAM 62 (a33). On the other hand, in a case where it is judged in the step S86 that there are not any lens registration data, the operation shifts to the step S89.

Hereinafter, since processing operations of steps S88 to S95 are the same as those of the steps S10 to S17 of the flow chart of FIG. 2 of the first embodiment, to avoid redundant description, it is assumed that the processing operations of the corresponding steps are performed, respectively, and the description thereof is omitted here.

It is to be noted that in FIG. 10, an operation of data communication of an accessory is similar to that of the communication of the lens data. Therefore, in FIG. 10, the reference numerals "131" to "135" of portions concerning the lens data are replaced with "331" to "335", the corresponding term "lens" is replaced with "accessory", "a31" to "a33" indicating the flow are replaced with "b31" to "b33", respectively, and the description thereof is omitted.

Thus, according to the fourth embodiment, it is possible to reduce a time for starting a camera even with respect to the plurality of interchangeable lenses or accessories.

Fifth Embodiment

Next, a fifth embodiment of the present invention will be described.

In the fourth embodiment, there has been described an example in which there are a plurality of (three in this case) data registration regions of each of an interchangeable lens and an accessory. In this fifth embodiment, there are a plurality of data registration regions of each of the lens and the accessory, and registration of lens or accessory data are managed in accordance with the number of times when the data are used.

Hereinafter, with reference to FIGS. 11 and 12, there will be described communication between an interchangeable lens 10 and a camera main body 20 at a time when a power source is turned on or the lens is attached in the fifth embodiment of the present invention.

Figure 11:
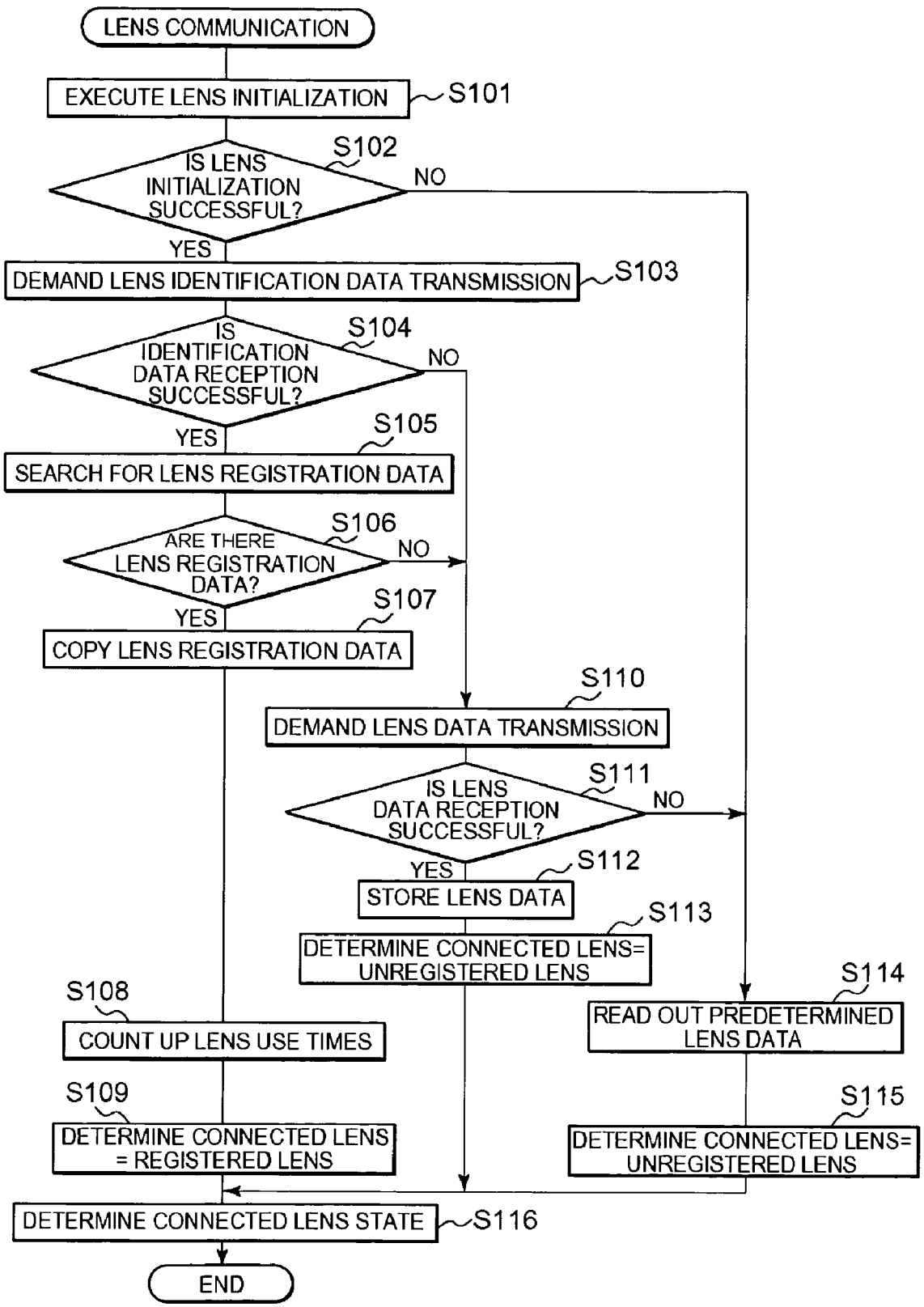
FIG. 11 is a flow chart showing an operation of lens communication at a time when a power source is turned on or a lens is attached in a fifth embodiment of the present invention.
Figure 12:
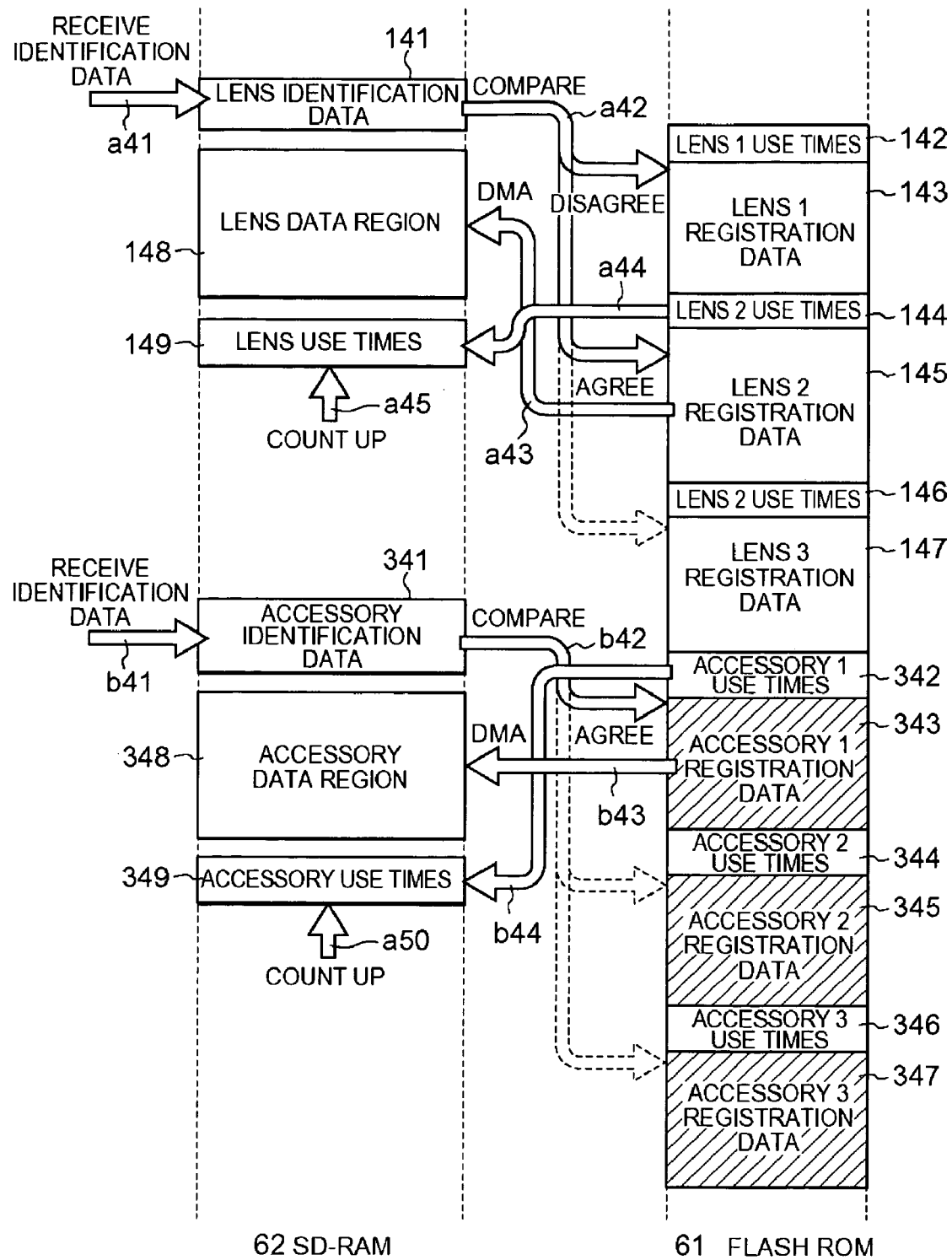
FIG. 12 is an explanatory view showing a flow of data between a flash ROM 61 and an SDRAM 62 in a camera main body 20 at a time when the power source is turned on or the lens is attached in the fifth embodiment of the present invention.

FIG. 11 is a flow chart showing an operation of lens communication at the time when the power source is turned on or the lens is attached in the fifth embodiment of the present invention, and FIG. 12 is an explanatory view showing a flow of data between a flash ROM 61 and an SDRAM 62 in the camera main body 20. It is to be noted that the operation of the lens communication is performed mainly under the control of a sequence controller 41.

When the present sequence is started, in step S101, initialization of the interchangeable lens 10 attached to the camera main body 20 is executed. Subsequently, it is judged in step S102 whether or not the initialization of the interchangeable lens 10 was successful. Here, if the initialization was successful, the operation shifts to step S103. If not, the operation shifts to step S113. In the step S103, transmission of the lens identification data from the interchangeable lens 10 is demanded, and it is judged in step S104 whether or not reception of lens identification data 141 was successful. As a result, if the reception was successful (a41), the operation shifts to step S105. If not, the operation shifts to step S110.

In the step S105, the flash ROM 61 of the camera main body 20 is searched for a plurality of (three in this case) data including lens 1 registration data 143, lens 2 registration data 145 and lens 3 registration data 147 (a42). Subsequently, it is judged in step S106 whether or not there is the lens registration data corresponding to the interchangeable lens 10. Here, when the data are present in the flash ROM 61, the operation shifts to step S107 to copy the corresponding lens registration data in a lens data region 148 of the SDRAM 62 (a43).

Moreover, in the subsequent step 108, the number of times when the interchangeable lens 10 was used is counted up. That is, use times data of the lens detected from the registered lens data are copied in the SDRAM 62 (a44), and the number of the times is counted up (a45).

On the other hand, in a case where it is judged in the step S106 that there are not any lens registration data. the operation shifts to step S110.

Hereinafter, since processing operations of steps S109 to S116 are the same as those of the steps S10 to S17 of the flow chart of FIG. 2 of the first embodiment, to avoid redundant description, it is assumed that the processing operations of the corresponding steps are performed, respectively, and the description thereof is omitted here.

It is to be noted that in FIG. 12, an operation of data communication of an accessory is similar to that of the communication of the lens data. Therefore, in FIG. 12, the reference numerals "141" to "149" of portions concerning the lens data are replaced with "341" to "349", the corresponding term "lens" is replaced with "accessory", "a41" to "a45" indicating the flow are replaced with "b41" to "b45", respectively, and the description thereof is omitted.

Next, with reference to FIGS. 13 to 15, there will be described communication between the interchangeable lens 10 and the camera main body 20 at a time when the power source is turned off in the fifth embodiment of the present invention.

Figure 13:
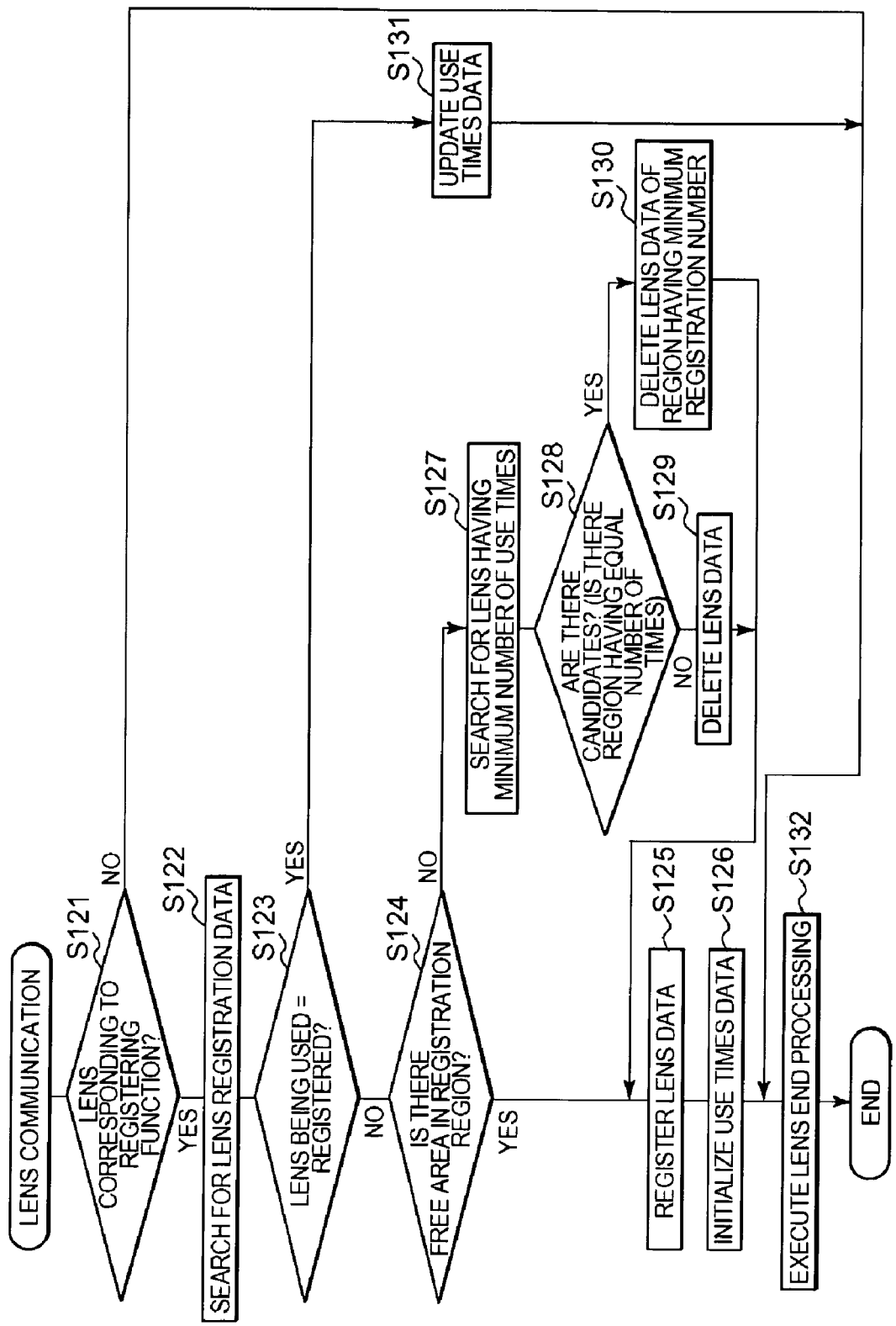
FIG. 13 is a flow chart showing an operation of lens communication at a time when a power source is turned off in the fifth embodiment of the present invention.

FIG. 13 is a flow chart showing an operation of lens communication at a time when the interchangeable lens is changed or the power source is turned off in the fifth embodiment of the present invention. FIGS. 14 and 15 are explanatory views showing a flow of data between the flash ROM 61 and the SDRAM 62 in the camera main body 20. It is to be noted that the operation of the lens communication is performed mainly under the control of the sequence controller 41.

When the present sequence is started, first in S121, it is judged whether or not the interchangeable lens 10 attached to the camera main body 20 is a lens corresponding to a registering function in accordance with lens identification data 151. Here, if the lens corresponds to the registering function, the operation shifts to step S122. If not, the operation shifts to step S132 described later.

In the step S122, the flash ROM 61 is searched for a plurality of (three in this case) lens 1 registration data 153 (163), lens 2 registration data 155 (165) and lens 3 registration data 157 (167) (a51) ((a61)). Subsequently, in step S123, the lens identification data 151 (161) are compared with the lens registration data 153 (163), 155 (165) and 157 (167) to judge whether or not the interchangeable lens being used has been registered.

Here, in a case where it is judged that the interchangeable lens 10 being used has already been registered, since any lens data do not have to be registered, the operation shifts to step S131. Moreover, in this step S131, the number of the use times of the interchangeable lens 10 is updated. In this case, when the lens 3 registration data 157 relates to the interchangeable lens 10 being used, only lens use times data 159 are written in the number 156 of lens 3 use times to update the number (a53). The registration of the lens data are not updated (a52). Thereafter, the operation shifts to step S132 described later.

On the other hand, in a case where it is judged in the step S123 that the attached interchangeable lens 10 is not registered (disagreement), it is judged in the next step S124 whether or not there is a free area in a registration region of the flash ROM 61. Here, if the free area is present in the registration region, the operation shifts to step S125. If there is not any free area, the operation shifts to step S127. Moreover, in the step S127, the lens registration data 163, 165 and 167 are compared to search for data having the minimum number of the use times. That is, the number 162 of use times of lens 1, the number 164 of use times of lens 2 and the number 166 of use times of lens 3 are compared to search for the minimum number of the use times (a62).

When the number of the lens use times is searched, it is judged in step S128 whether or not there are a plurality of pieces of data having the minimum number of the use times. As a result, when there are only one piece of data having the minimum number of the use times, the operation shifts to step S129 to delete the corresponding lens registration data (the lens 3 registration data 167 in this case) (a63). On the other hand, when it is judged in the step S128 that there are a plurality of pieces of data having the minimum number of the use times, the operation shifts to step S130. Moreover, in this step S130, lens data (the lens 1 registration data in this case) having the minimum registration number are deleted.

When the lens data are deleted in the step S129 or S130, the operation shifts to the step S125, and data (lens data region 168) of the interchangeable lens 10 being used are registered in the corresponding region of the flash ROM 61 from which the lens data have been deleted in the step S129 or S130 (a64). Next, in step S126, the use times data are initialized. In this case, when the lens 3 registration data 167 relates to the interchangeable lens being used, the number 166 of the use times of the lens 3 is initialized (a65).

Moreover, after the step S126 or S131, in the step S132, lens end processing is executed. Moreover, the present sequence ends.

Figure 14:
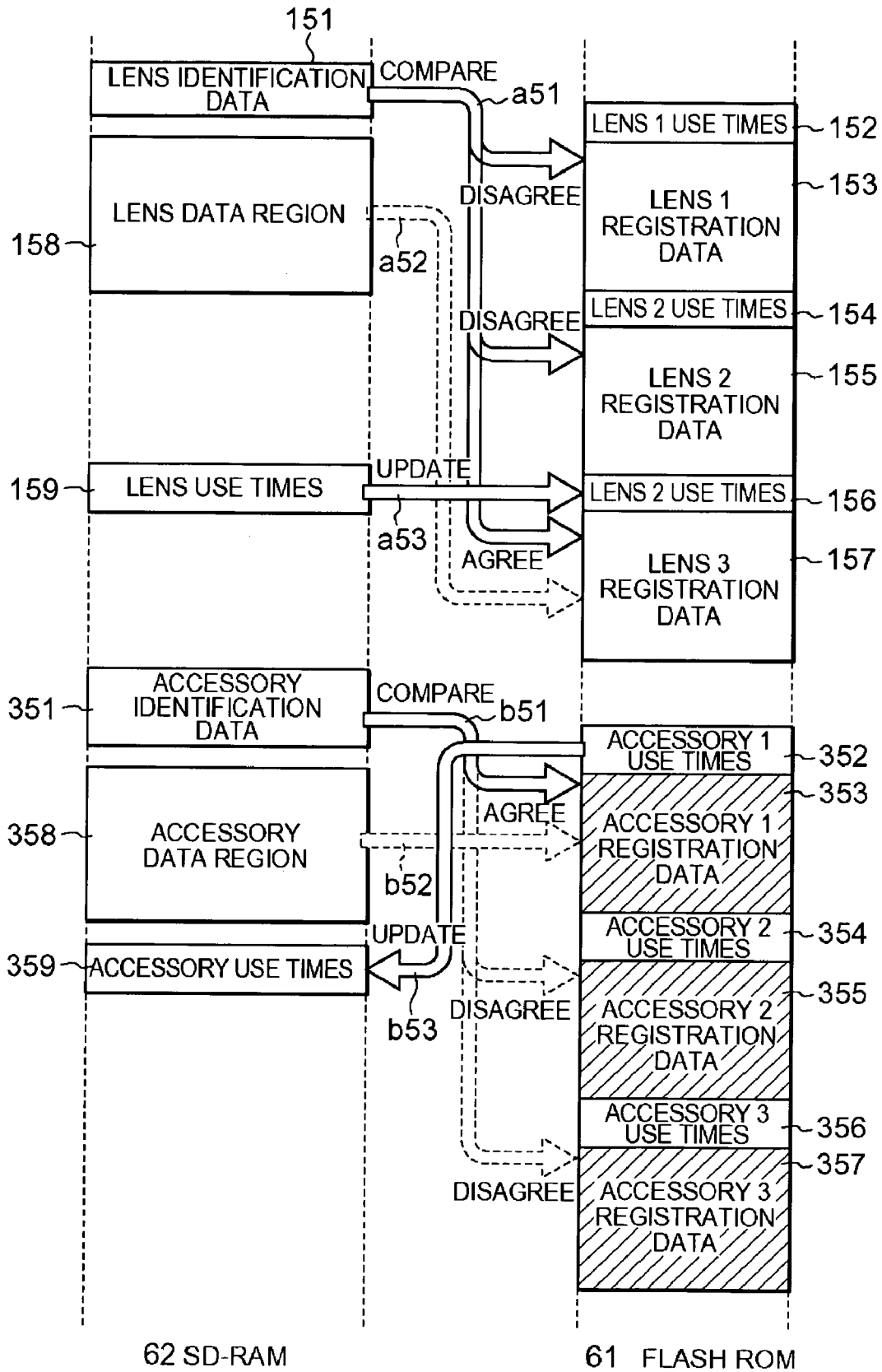
FIG. 14 is an explanatory view showing a flow of data between a flash ROM 61 and an SDRAM 62 in a camera main body 20 at a time when the power source is turned off in the fifth embodiment of the present invention.
Figure 15:
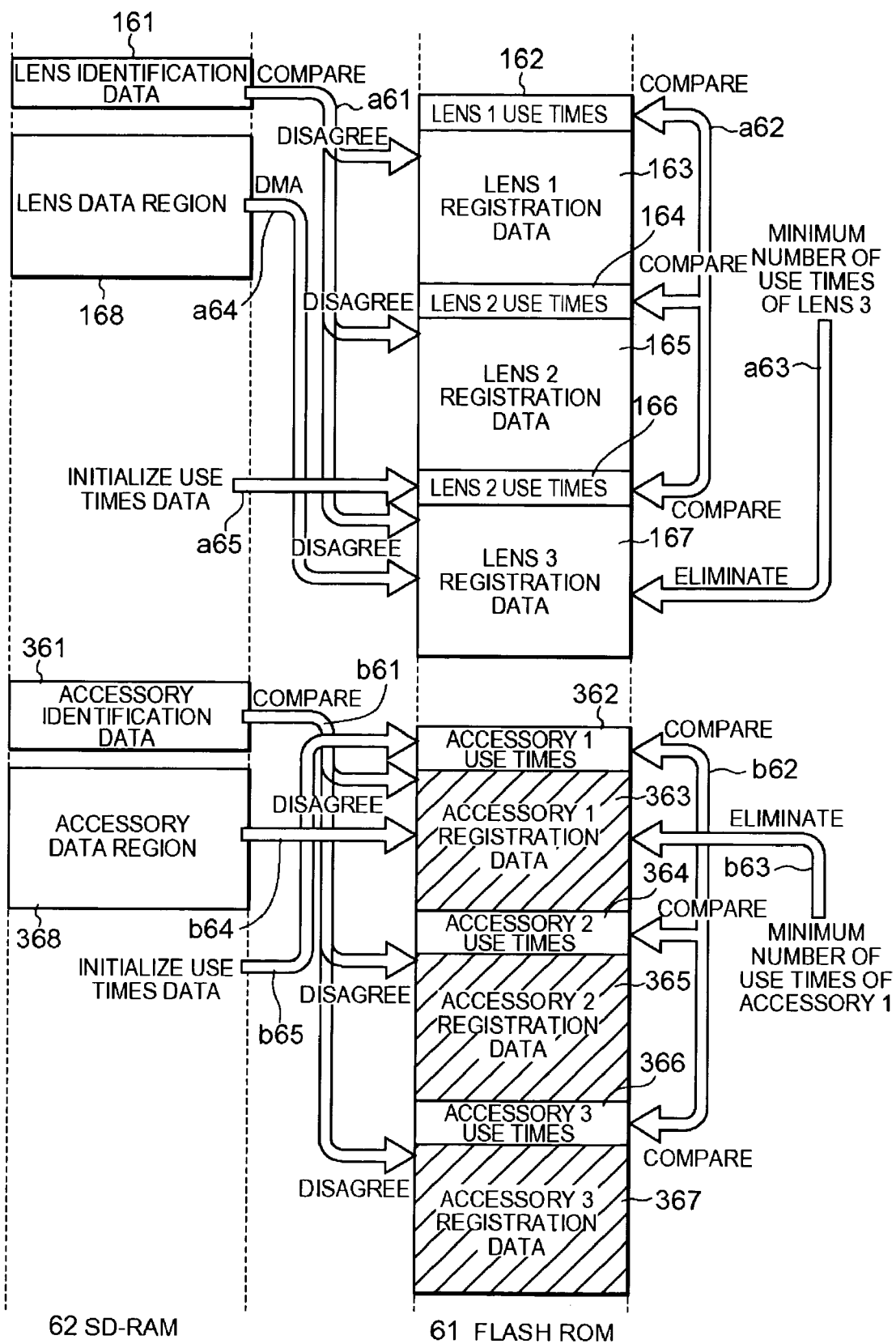
FIG. 15 is an explanatory view showing a flow of data between the flash ROM 61 and the SDRAM 62 in the camera main body 20 at the time when the power source is turned off in the fifth embodiment of the present invention.

It is to be noted that in FIGS. 14 and 15, an operation of data communication of an accessory is similar to that of the communication of the lens data. Therefore, in FIG. 14, the reference numerals "151" to "159" of portions concerning the lens data are replaced with "351" to "359", the corresponding term "lens" is replaced with "accessory", and "a51" to "a53" indicating the flow are replaced with "b51" to "b53". In FIG. 15, the reference numerals "161" to "168" of portions concerning the lens data are replaced with "361" to "368", the corresponding term "lens" is replaced with "accessory", "a61" to "a65" indicating the flow are replaced with "b61" to "b65", respectively, and the description thereof is omitted.

Thus, even according to the fifth embodiment, a time for starting a camera can be reduced while coping with the plurality of lenses or accessories. The flash ROM 61 can efficiently be utilized.

Sixth Embodiment

Next, a sixth embodiment of the present invention will be described.

In the fifth embodiment, there has been described an example in which there are a plurality of data registration regions of each of a lens and an accessory, and registration of lens or accessory data are managed in accordance with the number of use times of the data. This sixth embodiment relates to an example in which when the number of the use times of data is equal, the data are processed in order from data having a small registration number, and the registration of the data are managed in accordance with the number of rewrite times of the region.

Hereinafter, with reference to FIGS. 16 and 17, there will be described communication between an interchangeable lens 10 and a camera main body 20 at a time when a power source is turned off in the sixth embodiment of the present invention.

Figure 16:
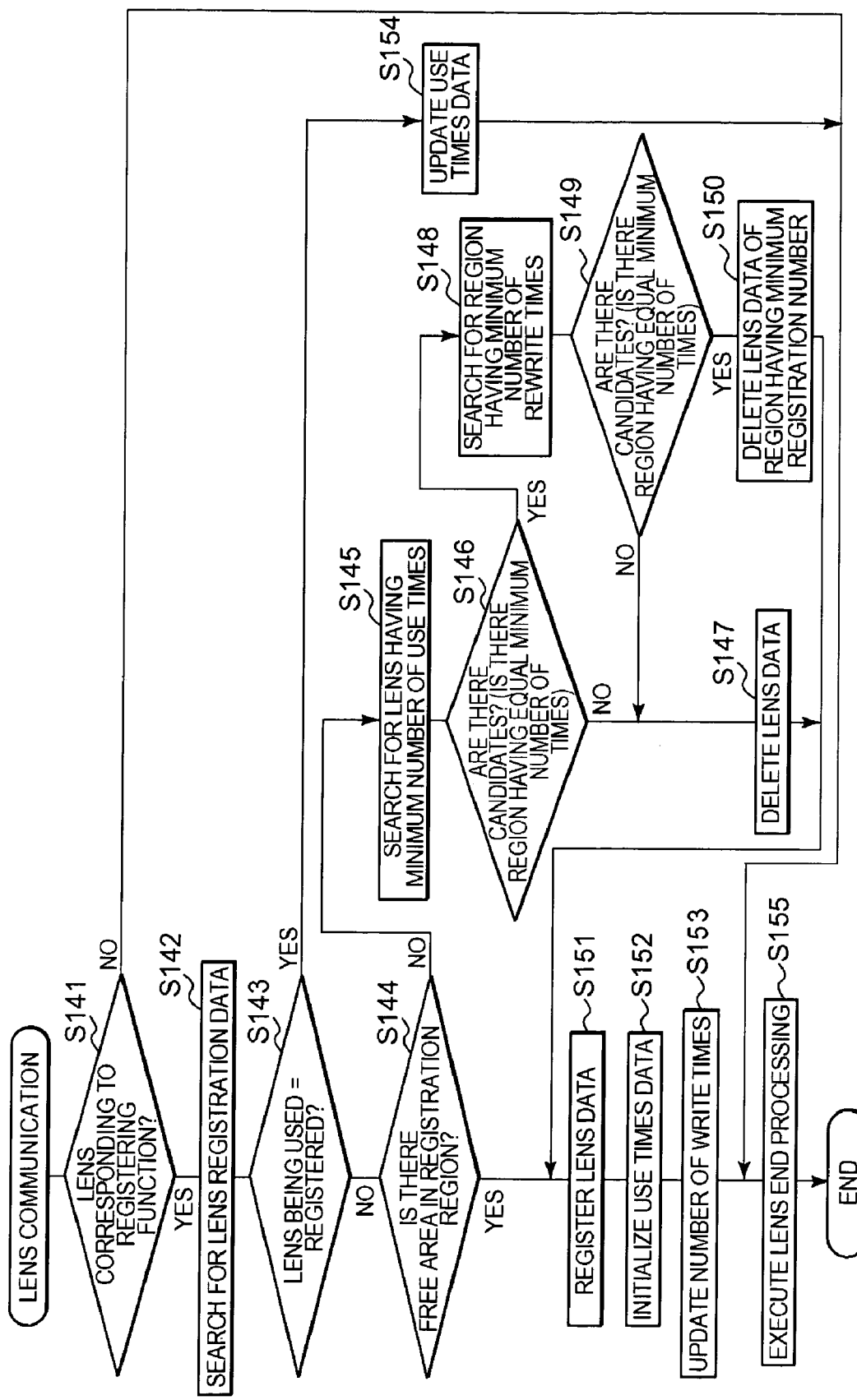
FIG. 16 is a flow chart showing an operation of lens communication at a time when a power source is turned off in a sixth embodiment of the present invention.
Figure 17:
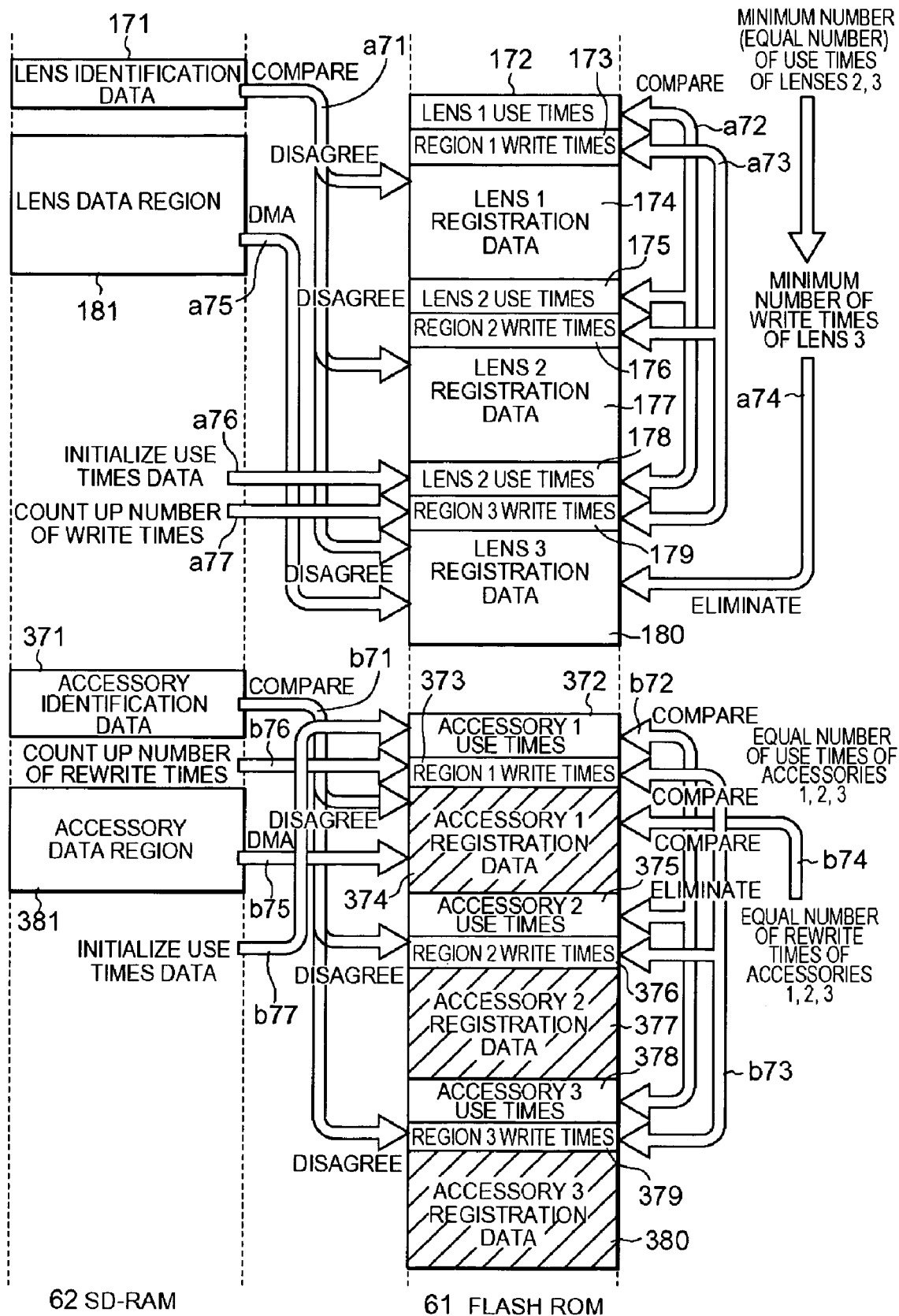
FIG. 17 is an explanatory view showing a flow of data between a flash ROM 61 and an SDRAM 62 in a camera main body 20 at the time when the power source is turned off in the sixth embodiment of the present invention.

FIG. 16 is a flow chart showing an operation of lens communication at the time when the power source is turned off in the sixth embodiment of the present invention, and FIG. 17 is an explanatory view showing a flow of data between a flash ROM 61 and an SDRAM 62 in the camera main body 20. It is to be noted that the operation of the lens communication is performed mainly under the control of a sequence controller 41.

When the present sequence is started, first in step S141, it is judged whether or not the interchangeable lens 10 attached to the camera main body 20 is a lens corresponding to a registering function in accordance with lens identification data 171. Here, if the lens corresponds to the registering function, the operation shifts to step S142. If not, the operation shifts to step In step S142, the flash ROM 61 is searched for a plurality pieces of (three in this case) lens 1 registration data 174, lens 2 registration data 177 and lens 3 registration data 180 (a71). Subsequently, in step S143, the lens identification data 171 are compared with the lens registration data 174, 177 and 180 to judge whether or not the interchangeable lens 10 being used has been registered.

Here, in a case where it is judged that the interchangeable lens being used is a lens already registered, since any lens data do not have to be registered, the operation shifts to step S154. Moreover, in this step S154, the number of use times of the interchangeable lens 10 is updated. Thereafter, the operation shifts to step S155.

On the other hand, in a case where it is judged in the step S143 that the attached interchangeable lens is not registered (disagreement), next in step S144, it is judged whether or not there is a free area in a registration region of the flash ROM 61. Here, if the free area is present in the registration region, the operation shifts to step S151. If there is not any free area, however, the operation shifts to step S145. Moreover, in the step S144, the lens registration data 174, 177 and 180 are compared to search for the data having the minimum number of the use times of the data. That is, the number 172 of use times of lens 1, the number 175 of use times of lens 2 and the number 178 of use times of lens 3 are compared to search for the minimum number of the use times (a72).

When the number of the lens use times is searched, it is judged in step S146 whether or not there are a plurality pieces of data having the minimum number of the use times. As a result, when there is only one pieces of data having the minimum number of the use times, the operation shifts to step S147. On the other hand, when it is judged in the step S146 that there are a plurality pieces of data having the minimum number of the use times, the operation shifts to step S148. In this step S148, regions are compared to search for the region having the minimum number of rewrite times. That is, the number 173 of write times of regional, the number 176 of write times of region 2 and the number 179 of write times of region 3 are compared (a73).

Next, it is judged in step S149 whether or not there are a plurality of regions having the minimum number of the rewrite times compared in the step S148. Here, if there is only one region having the minimum number of the rewrite times, the operation shifts to step S147. If there are a plurality of such regions, the operation shifts to step S150. In step S147, the lens data (lens 3 registration data in this case) of the corresponding data region is deleted. In the step S150, the lens data of the data region having the minimum region number is deleted. In this case, assuming that the number 175 of the use times of the lens 2 is equal to the number 178 of the use times of the lens 3, and the number 179 of the write times of the region 3 is minimum, the lens 3 registration data 180 are deleted (a74).

Moreover, when the lens data are deleted in the step S147 or S150, the operation shifts to step S151, and data (lens data region 181) of the interchangeable lens 10 being used is registered in the corresponding region of the flash ROM 61 from which the lens data have been deleted in the step S147 or S150 (a75). Next, in step S152, the use times data are initialized. In this case, when the lens 3 registration data 180 relates to the interchangeable lens being used, the number 178 of the use times of the lens 3 is initialized (a76). Further in step S153, the number of the write times is counted up to update the number 179 of the write times of the region 3 (a77).

Furthermore, after the step S153 or S154, in the step S155, lens end processing is executed. Moreover, the present sequence ends.

It is to be noted that in FIGS. 16 and 17, an operation of data communication of an accessory is similar to that of the communication of the lens data. Therefore, in FIG. 17, the reference numerals "171" to "181" of portions concerning the lens data are replaced with "371" to "381", the corresponding term "lens" is replaced with "accessory", "a71" to "a77" indicating the flow are replaced with "b71" to "b73", respectively, and the description thereof is omitted.

Thus, even according to the sixth embodiment, a time for starting a camera the next time can be reduced. When the number of the use times of the data is equal, the data are processed in order from the data having the small registration number. In this case, the data are rewritten in the same region in a concentrated manner, and life of the specific region might be shortened, but according to the present embodiment, the data are managed in accordance with the number of the rewrite times of the region. Therefore, the data are not rewritten in the same region in the concentrated manner.

Seventh Embodiment

Next, a seventh embodiment of the present invention will be described.

In the fourth and fifth embodiments, there has been described an example in which there are a plurality pieces of data registration regions of each of a lens and an accessory, and registration of lens or accessory data are managed in accordance with the number of use times of the data. In this seventh embodiment, the registration data are managed in accordance with a use date.

Hereinafter, with reference to FIGS. 18 and 19, there will be described communication between an interchangeable lens 10 and a camera main body 20 at a time when a power source is turned off in the seventh embodiment of the present invention.

Figure 18:
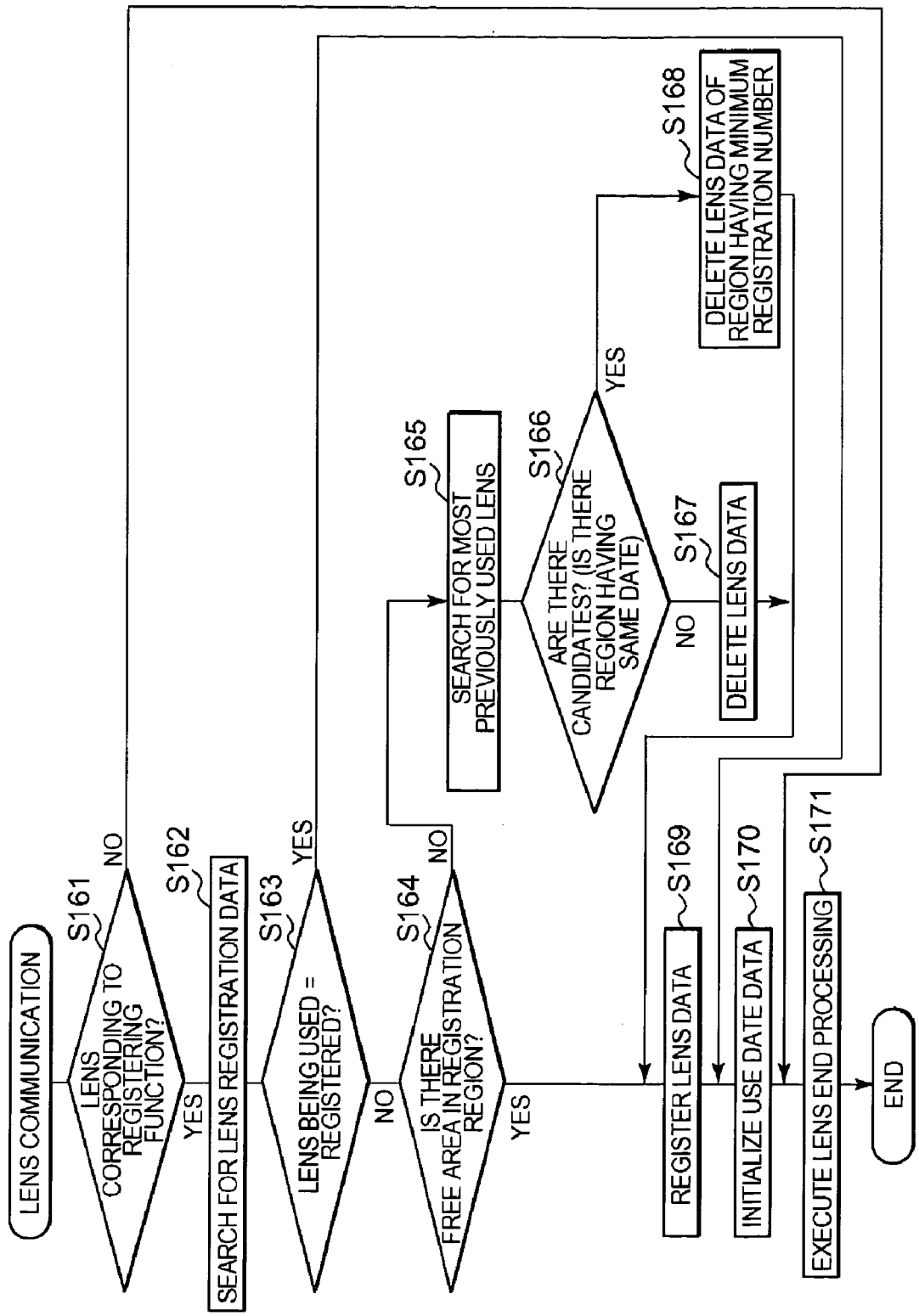
FIG. 18 is a flow chart showing an operation of lens communication at a time when a power source is turned off in a seventh embodiment of the present invention.
Figure 19:
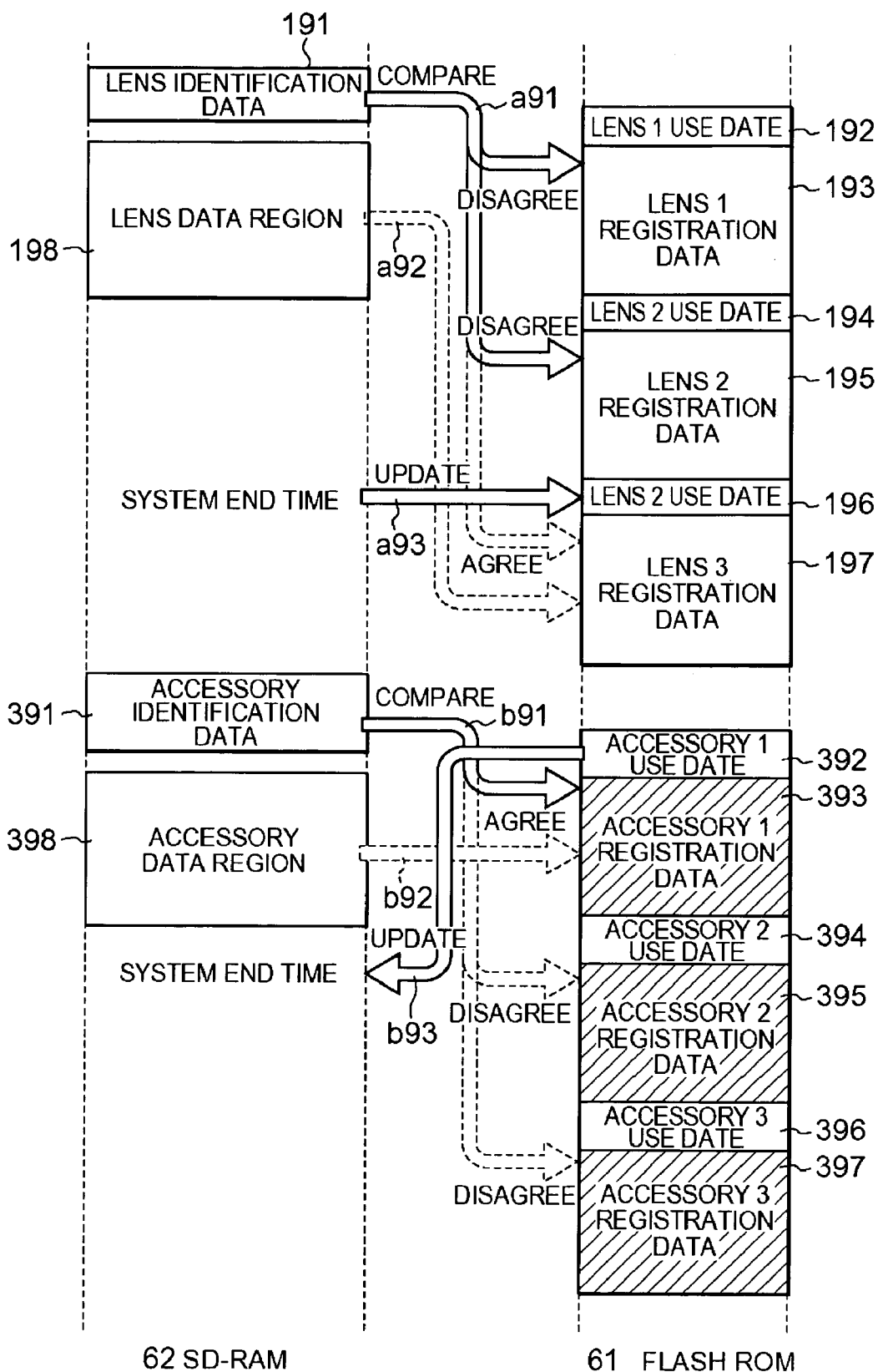
FIG. 19 is an explanatory view showing a flow of data between a flash ROM 61 and an SDRAM 62 in a camera main body 20 at a time when the power source is turned off in the seventh embodiment of the present invention.

FIG. 18 is a flow chart showing an operation of lens communication at a time when an interchangeable lens is changed or the power source is turned off in the seventh embodiment of the present invention, and FIG. 19 is an explanatory view showing a flow of data between a flash ROM 61 and an SDRAM 62 in the camera main body 20. It is to be noted that the operation of the lens communication is performed mainly under the control of a sequence controller 41.

When the present sequence is started, first in step S161, it is judged whether or not the interchangeable lens 10 attached to the camera main body 20 is a lens corresponding to a registering function in accordance with lens identification data 191. Here, if the lens corresponds to the registering function, the operation shifts to step S162. If not, the operation shifts to step S171.

In step S162, the flash ROM 61 is searched for a plurality pieces of (three in this case) lens 1 registration data 193, lens 2 registration data 195 and lens 3 registration data 197 (a91). Subsequently, in step S163, the lens identification data 191 are compared with the lens registration data 193, 195 and 197 to judge whether or not the interchangeable lens being used has been registered.

Here, in a case where it is judged that the interchangeable lens being used is a lens already registered, since any lens data does not have to be registered, the operation shifts to step S170 described later. On the other hand, in a case where it is judged in the step S163 that the attached interchangeable lens is not registered (disagreement), next in step S164, it is judged whether or not there is a free area in a registration region of the flash ROM 61. Here, if the free area is present in the registration region, the operation shifts to step S169. If there is not any free area, however, the operation shifts to step S165.

Moreover, in the step S165, the lens registration data 193, 195 and 197 are compared to search for data having the oldest date when the data were used (a91). As a result, it is judged in step S166 whether or not there are a plurality pieces of data having the same use date of the most previously used lens. The case where there are a plurality pieces of data having the same use date of the most previously used lens occurs, when a time management unit is comparatively long, for example, one hour or the like. The case infrequently occurs, when calendar/clock setting of the camera main body 20 or the like is changed halfway. Here, when there is only one pieces of data, the operation shifts to step S167 to delete the corresponding lens data. On the other hand, in a case where there are a plurality pieces of data having the same use date of the most previously used lens, the operation shifts to step S168 to delete the lens data of the region having the minimum registration region number.

In the step S169, if the free area is present, the lens data (lens data region 198) are written in the free area. Alternatively, the lens data are registered in the region from which the lens data have been deleted in the step S167 or S168 (a92). Subsequently, in the step S170, the use date data are updated, that is, a system end time (lens 3 use date 196 in this case) is updated (a93).

Thereafter, in the step S171, lens end processing is executed. Moreover, the present sequence ends.

It is to be noted that in FIGS. 18 and 19, an operation of data communication of an accessory is similar to that of the communication of the lens data. Therefore, in FIG. 19, the reference numerals "191" to "198" of portions concerning the lens data are replaced with "391" to "398", the corresponding term "lens" is replaced with "accessory", "a91" to "a93" indicating the flow are replaced with "b91" to "b93", respectively, and the description thereof is omitted.

Thus, even according to the seventh embodiment, a memory can effectively be used, and a time for starting a camera the next time can be reduced.

Eighth Embodiment

Next, an eighth embodiment of the present invention will be described.

In the seventh embodiment, there has been described an example in which there are a plurality pieces of data registration regions of each of a lens and an accessory, and registration data are managed in accordance with a use date. In this eighth embodiment, when the use date of the data is the same, the data are registered in order from a small registration number, and managed in accordance with the number of rewrite times of the region.

Hereinafter, with reference to FIGS. 20 and 21, there will be described communication between an interchangeable lens 10 and a camera main body 20 at a time when a power source is turned off in the eighth embodiment of the present invention.

Figure 20:
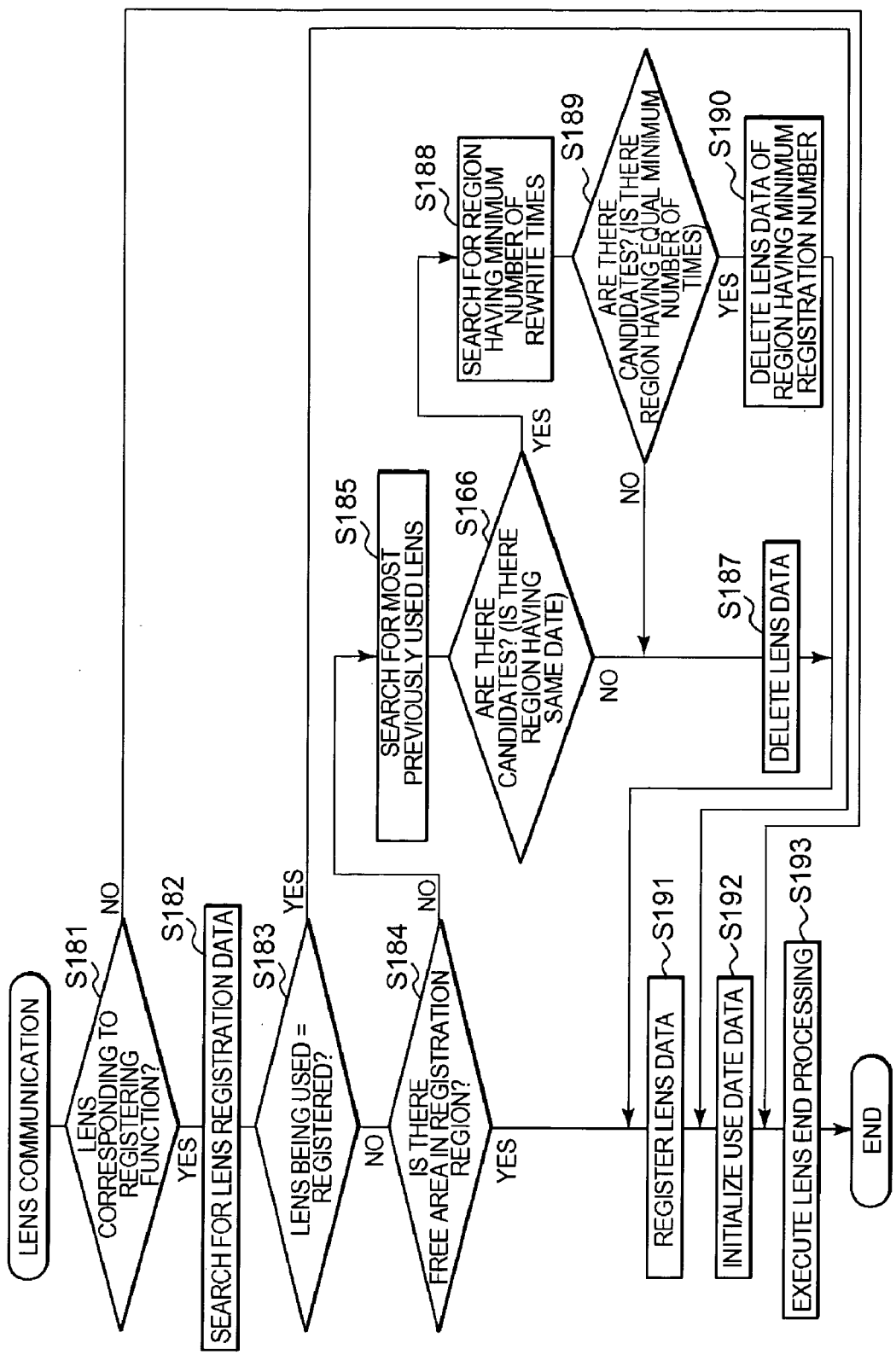
FIG. 20 is a flow chart showing an operation of lens communication at a time when a power source is turned off in an eighth embodiment of the present invention.
Figure 21:
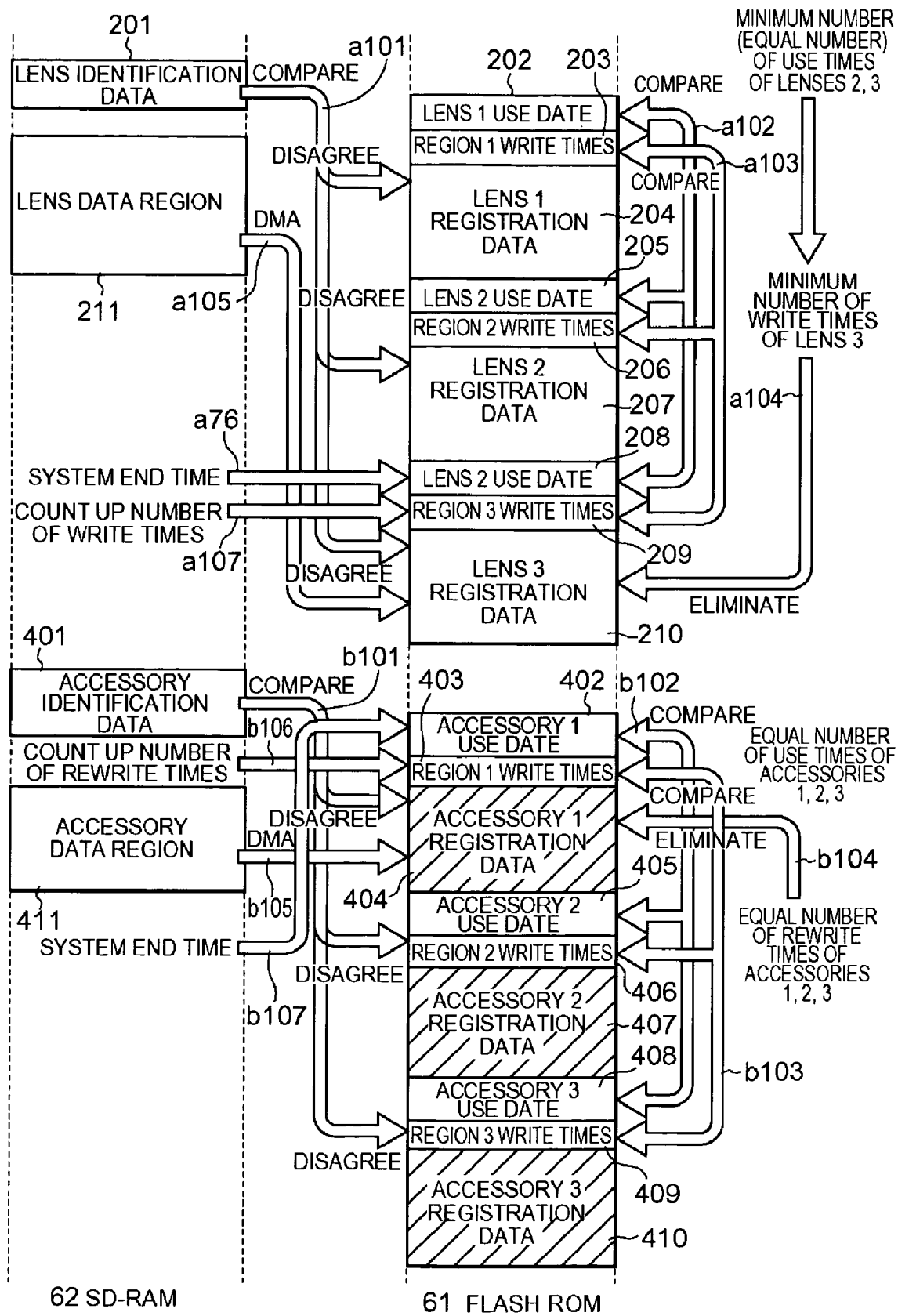
FIG. 21 is an explanatory view showing a flow of data between a flash ROM 61 and an SDRAM 62 in a camera main body 20 at a time when the power source is turned off in the eighth embodiment of the present invention.

FIG. 20 is a flow chart showing an operation of lens communication at a time when the power source is turned off in the eighth embodiment of the present invention, and FIG. 21 is an explanatory view showing a flow of data between a flash ROM 61 and an SDRAM 62 in the camera main body 20. It is to be noted that the operation of the lens communication is performed mainly under the control of a sequence controller 41.

When the present sequence is started, first in step S181, it is judged whether or not the interchangeable lens 10 attached to the camera main body 20 is a lens corresponding to a registering function in accordance with lens identification data 201. Here, if the lens corresponds to the registering function, the operation shifts to step S182. If not, the operation shifts to step S193.

In step S182, the flash ROM 61 is searched for a plurality pieces of (three in this case) lens 1 registration data 204, lens 2 registration data 207 and lens 3 registration data 210 (a101). Subsequently, in step S183, the lens identification data 201 are compared with the lens registration data 204, 207 and 210 to judge whether or not the interchangeable lens being used has been registered.

Here, in a case where it is judged that the interchangeable lens being used is a lens already registered, since any lens data do not have to be registered, the operation shifts to step S192 described later. On the other hand, in a case where it is judged in the step S183 that the attached interchangeable lens is not registered (disagreement), next in step S184, it is judged whether or not there is a free area in a registration region of the flash ROM 61. Here, if the free area is present in the registration region, the operation shifts to step S191. If there is not any free area, however, the operation shifts to step S185.

Moreover, in the step S185, lens 1 use date 202, lens 2 use date 205 and lens 3 use date 208 are compared to search for the oldest date when the lens was used (a102). As a result, it is judged in step S186 whether or not there are a plurality pieces of data having the same use date of the most previously used lens. Here, when there is only one pieces of data having such a use date, the operation shifts to step S187 to delete the corresponding lens data. On the other hand, in a case where there are a plurality pieces of data having the same use date of the most previously used lens, the operation shifts to step S188 to search for the region having the minimum number of write times. That is, the number 203 of write times of region 1, the number 206 of write times of region 2 and the number 209 of write times of region 3 are searched (a103).

Next, it is judged in step S189 whether or not there are a plurality of regions having the equal minimum number of rewrite times searched in the step S188. Here, when there is only one region having the minimum number of the rewrite times, the operation shifts to step S187. When there are a plurality of such regions, the operation shifts to step S190. In the step S187, there are deleted the corresponding lens data (lens 3 registration data in this case) of the data region having the minimum number of the use times. In the step S190, the lens data of the region having the minimum registration region number are deleted. In this case, assuming that use dates of lenses 2, 3 are oldest, the use date is the same, and the number 209 of the write times of the region 3 is minimum, the lens 3 registration data 210 is deleted (a104).

Moreover, when the lens data are deleted in the step S187 or S190, the operation shifts to the step S191, and the data (lens data region 211) of the interchangeable lens 10 being used are registered in the corresponding region of the flash ROM 61 from which the lens data have been deleted in the step S187 or S190 (a105). Subsequently, in the step S192, the use date data and the number of the write times are updated (a106). In this case, when the lens 3 registration data 210 relates to the interchangeable lens being used, two data of the lens 3 use date 208 and the number 209 of the write times of the region 3 are updated (a106, a107).

Thereafter, in the step S193, lens end processing is executed. Moreover, the present sequence ends.

It is to be noted that in FIGS. 20 and 21, an operation of data communication of an accessory is similar to that of the communication of the lens data. Therefore, in FIG. 21, the reference numerals "201" to "211" of portions concerning the lens data are replaced with "401" to "411", the corresponding term "lens" is replaced with "accessory", "a101" to "a107" indicating the flow are replaced with "b101" to "b107", respectively, and the description thereof is omitted.

Thus, even according to the eighth embodiment, a time for starting a camera the next time can be reduced. In a case where the data have the same use date, when the data are registered in order from the data having the small registration region number, the data might be rewritten in the same region in a concentrated manner. According to the present embodiment, however, since the data are managed in accordance with the number of the rewrite times of the region, the data are not rewritten in the same region in the concentrated manner.

It is to be noted that in the eighth embodiment, the lens use date and the number of the write times of the region are written in the flash ROM 61, but the embodiment is not limited to this example. For example, a backup block such as EEPROM may be used. In this case, when the data agrees with the registered data, the data are not written in the flash ROM 61, and may be stored in the backup block. In consequence, life of the flash ROM 61 can further be extended.

Figure 22:
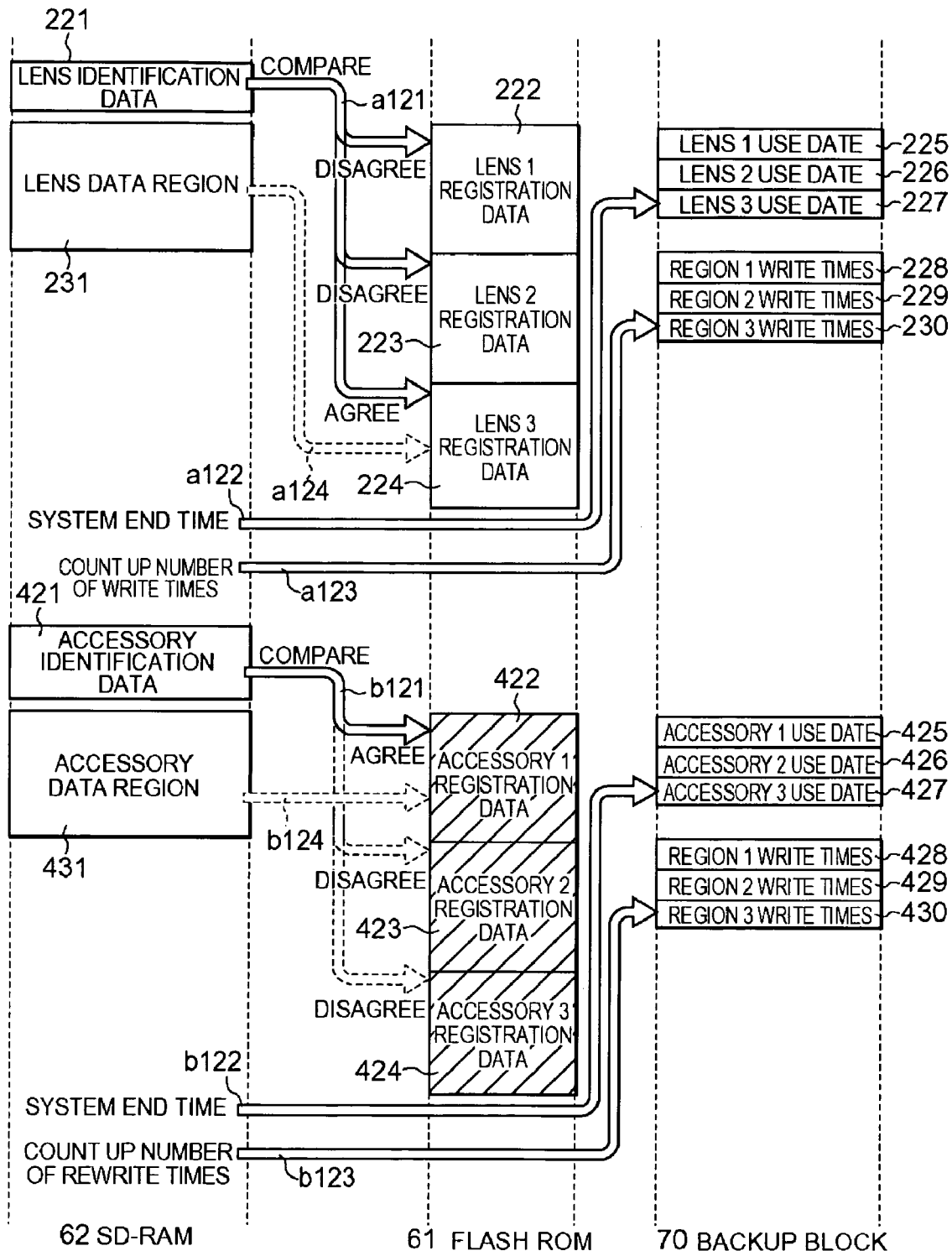
FIG. 22 is an explanatory view showing a flow of data between a flash ROM 61 and an SDRAM 62 in a camera main body 20 in a first modification of the eighth embodiment of the present invention.

FIG. 22 is an explanatory view showing a flow of data between a flash ROM 61 and an SDRAM 62 in a camera main body 20 in a first modification of the eighth embodiment of the present invention. It is to be noted that an operation of lens communication is performed mainly under the control of a sequence controller 41.

The flash ROM 61 is searched for a plurality of (three in this case) lens 1 registration data 222, lens 2 registration data 223 and lens 3 registration data 224. Subsequently, lens identification data 221 are compared with the lens registration data 222, 223 and 224 to judge whether or not the interchangeable lens being used has been registered.

When the data agrees with the registered data, the lens data of the corresponding use date data region are deleted to update lens 3 use date data (a122).

Thereafter, the number of the write times is counted up, and the number of the write times of the region 3 is updated (a123). Since the lens data are registered, needless to say, updating of the lens 3 registration data (a124) is not performed, and management data (use date, the number of the write times, etc.) are not written in the flash ROM 61. As a result, the number of the write times in the flash ROM 61 is reduced, and life can be extended.

It is to be noted that in FIG. 22, an operation of data communication of an accessory is similar to that of the communication of the lens data. Therefore, in FIG. 22, the reference numerals "221" to "231" of portions concerning the lens data are replaced with "421" to "431", the corresponding term "lens" is replaced with "accessory", "a121" to "a124" indicating the flow are replaced with "b121" to "b124", respectively, and the description thereof is omitted.

Figure 23:
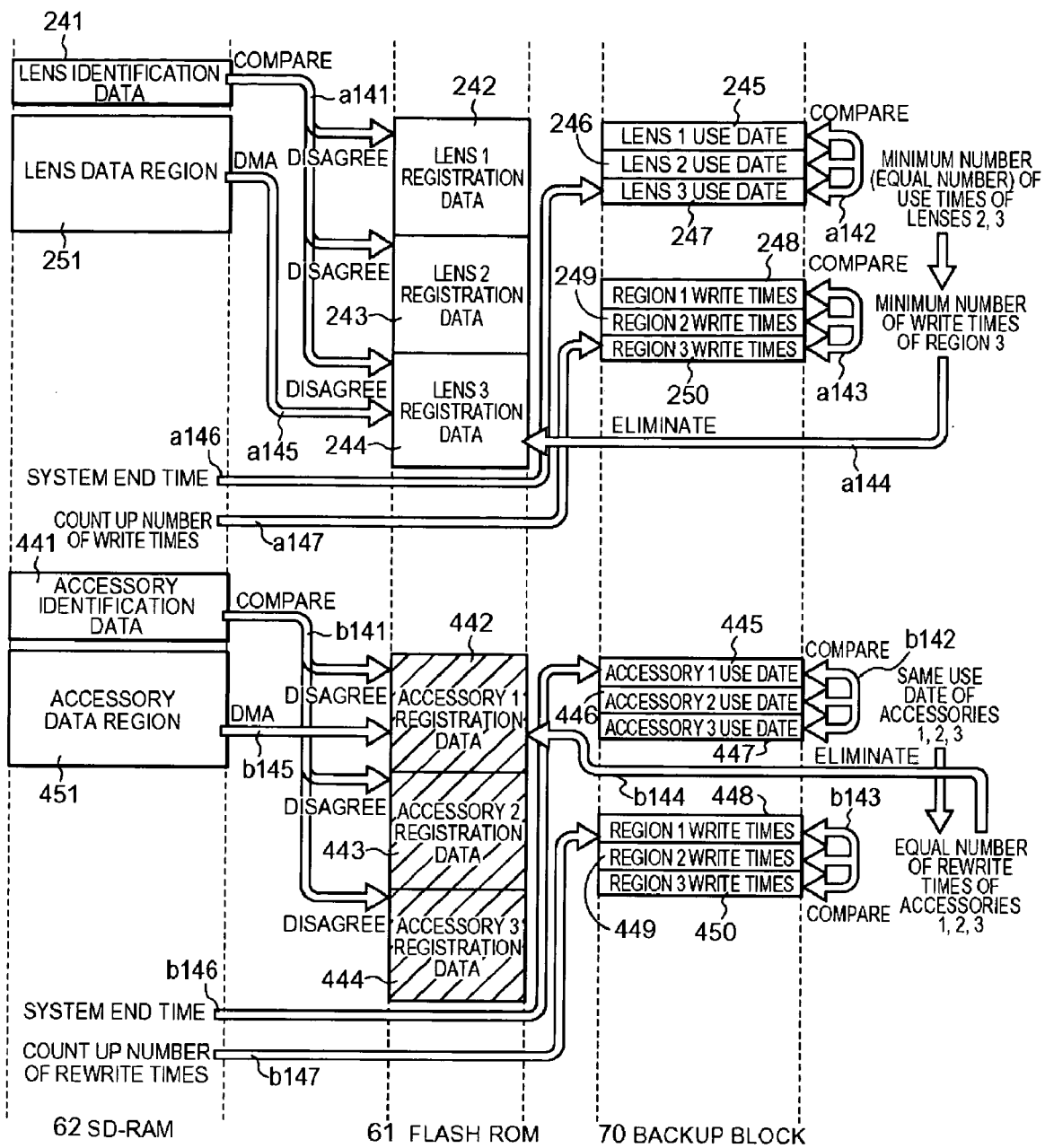
FIG. 23 is an explanatory view showing a flow of data between the flash ROM 61 and the SDRAM 62 in the camera main body 20 in a case where a lens being used is not registered in the eighth embodiment of the present invention.

FIG. 23 is an explanatory view showing a flow of data between the flash ROM 61 and the SDRAM 62 in the camera main body 20 in a case where a lens being used is not registered in the eighth embodiment of the present invention. It is to be noted that the operation of the lens communication is performed mainly under the control of the sequence controller 41.

In the same manner as in FIG. 22, the flash ROM 61 is searched for a plurality of (three in this case) lens 1 registration data 242, lens 2 registration data 243 and lens 3 registration data 244. Subsequently, lens identification data 241 are compared with the lens registration data 242, 243 and 244 to judge whether or not the interchangeable lens being used has been registered (a141).

As a result of comparison, when data do not agree with any registered data, a backup block 70 is searched for the oldest date when the lens was used among lens 1 use date 245, lens 2 use date 246 and lens 3 use date 247 (a142). When there are a plurality of use dates of the most previously used lens, a region having the minimum number of rewrite times is searched. That is, the number 248 of the write times of region 1, the number 249 of the write times of region 2 and the number 250 of the write times of region 3 are searched (a143).

In the present example, it is judged that the region 3 has the minimum number of the write times.

Thereafter, a lens data region 251 is copied as lens registration data (a145). Moreover, the corresponding lens use date and the number of the write times of the region are updated (a146, a147).

It is to be noted that in FIG. 23, an operation of data communication of an accessory is similar to that of the communication of the lens data. Therefore, in FIG. 23, the reference numerals "241" to "251" of portions concerning the lens data are replaced with "441" to "451", the corresponding term "lens" is replaced with "accessory", "a141" to "a147" indicating the flow are replaced with "b141" to "b147", respectively, and the description thereof is omitted.

Moreover, in FIGS. 22, 23, "the lens use date" may be replaced with "the number of the use times".

Ninth Embodiment

Next, a ninth embodiment of the present invention will be described.

In the above eighth embodiment, there has been described an example in which when there are a plurality of lens and accessory data registration regions, and use date of data is the same, data are registered in order from a small registration number and managed in accordance with the number of rewrite times of the region. In the present ninth embodiment, there will be described an example in which when there are a plurality of lens data registration regions, and the registration region is shared by a lens and an accessory, lens data are preferentially stored.

Hereinafter, with reference to FIGS. 24 and 25, there will be described communication between an interchangeable lens 10 and a camera main body 20 at a time when the interchangeable lens is changed or a power source is turned off in the ninth embodiment of the present invention.

Figure 24:
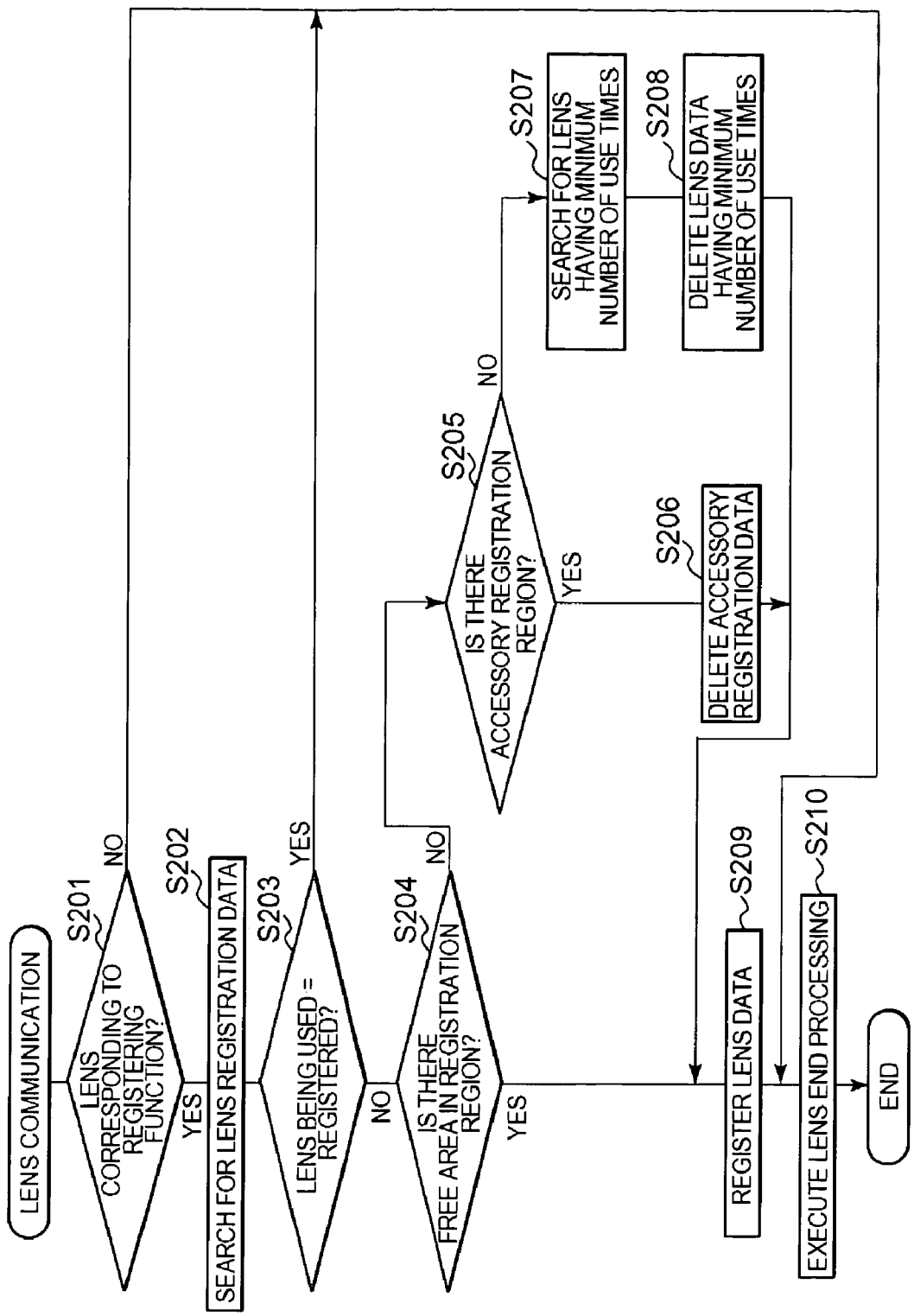
FIG. 24 is a flow chart showing an operation of lens communication at a time when a power source is turned off in a ninth embodiment of the present invention.
Figure 25:
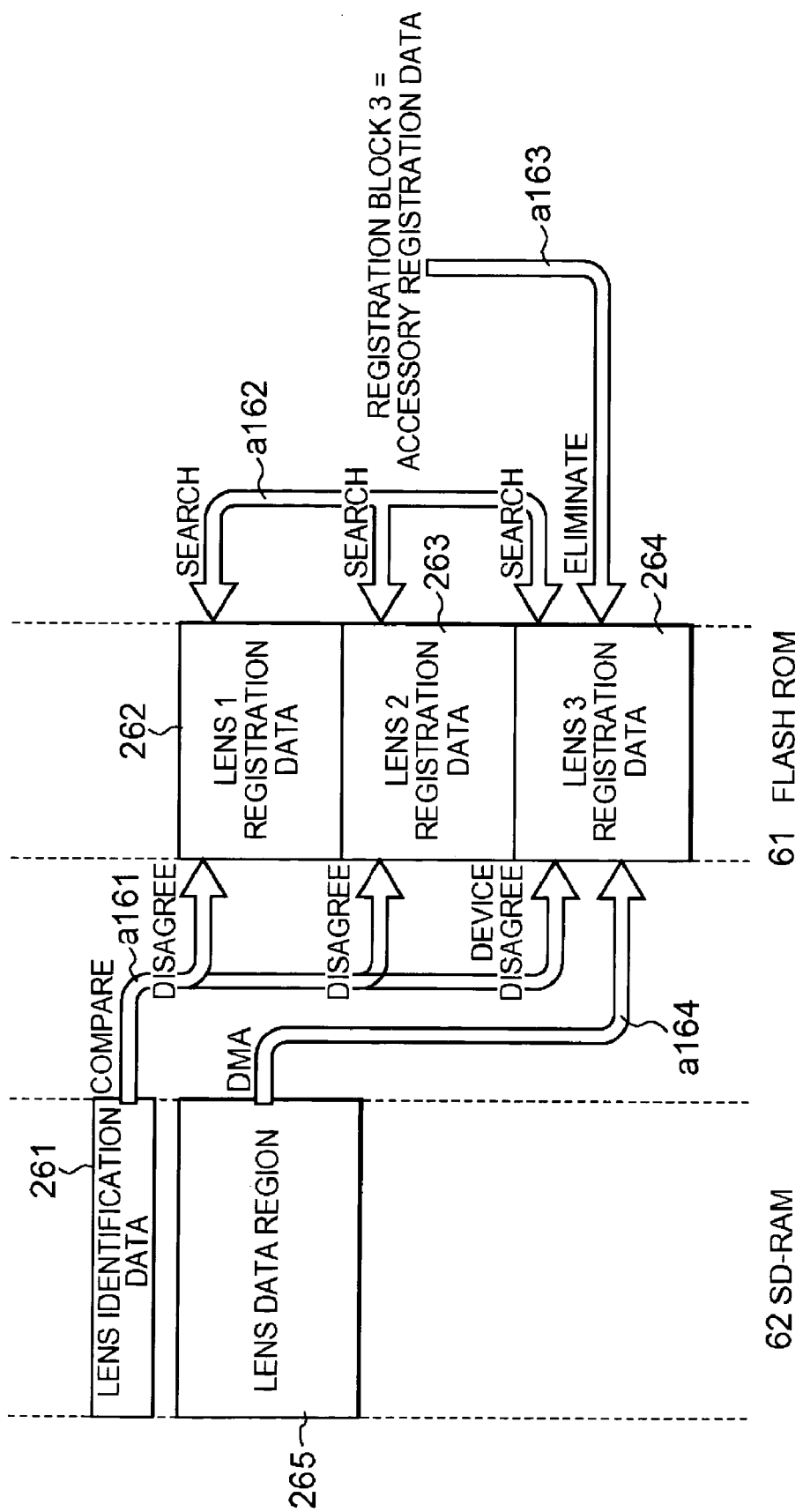
FIG. 25 is an explanatory view showing a flow of data between a flash ROM 61 and an SDRAM 62 in a camera main body 20 at the time when the power source is turned off in the ninth embodiment of the present invention.

FIG. 24 is a flow chart showing an operation of lens communication at a time when the power source is turned off in the ninth embodiment of the present invention, and FIG. 25 is an explanatory view showing a flow of data between a flash ROM 61 and an SDRAM 62 in the camera main body 20. It is to be noted that an operation of lens communication is performed mainly under the control of a sequence controller 41.

When the present sequence is started, first in step S201, it is judged whether or not the interchangeable lens 10 attached to the camera main body 20 is a lens corresponding to a registering function in accordance with lens identification data 201. Here, if the lens corresponds to the registering function, the operation shifts to step S202. If not, the operation shifts to step S210.

In step S202, the flash ROM 61 is searched for a plurality pieces of (three in this case) lens 1 registration data 262, lens 2 registration data 263 and accessory registration data 264 (a161). Subsequently, in step S203, the lens identification data 261 are compared with the lens registration data 262, 263 and the accessory registration data 264 to judge whether or not the interchangeable lens being used have been registered.

Here, in a case where it is judged that the interchangeable lens being used is a lens already registered, since any lens data do not have to be registered, the operation shifts to step S210 described later. On the other hand, in a case where it is judged in the step S203 that the attached interchangeable lens is not registered (disagreement or device disagreement), next in step S204, it is judged whether or not there is a free area in a registration region of the flash ROM 61. Here, if the free area is present in the registration region, the operation shifts to step S209. If there is not any free area, however, the operation shifts to step S205.

In this step S205, it is judged whether or not there is an accessory registration region in the flash ROM 61 (a162). Here, if the accessory registration region is present, the accessory registration data 264 is deleted from this accessory registration region (a163). On the other hand, when there is not any accessory registration region in the step S205, the operation shifts to step S207 to search for data having the minimum number of use times of the data among the lens registration data 262, 263 and the accessory registration data 264 (not shown, but the lens data are registered in this case). When the data having the minimum number of the use times of the lens are searched, in the subsequent step S208, the corresponding lens or accessory registration data are deleted.

When in the step S206 or S208, the accessory or lens registration data are deleted, the operation shifts to the step S209 to register data (lens data region 265) of the interchangeable lens 10 being used in the corresponding region of the flash ROM 61 from which the accessory or lens data have been deleted in the step S206 or S208 (a164). Next, in the step S210, lens end processing is executed. Moreover, the present sequence ends.

Thus, according to the ninth embodiment, when the lens registration region of the flash ROM 61 is filled with the lens registration data, the accessory registration data are deleted to preferentially store the lens registration data.

It is to be noted that in the first to ninth embodiments, it has been described that the lens registration data and the accessory registration data are stored in the flash ROM 61, but the present invention is not limited to these embodiments, and the data may be stored in any nonvolatile memory.

Moreover, there is not any restriction on the accessory as long as the accessory is attached between the interchangeable lens 10 and the camera main body 20, and the accessory corresponds to, for example, a tele-conversion lens or the like.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera to which a plurality of types of photographing lenses can be detachably attached, comprising:
   a nonvolatile memory which can register one or more pieces of specific information of the photographing lenses;
   a volatile memory which is operable at a speed higher than that of the nonvolatile memory; and
   a control circuit which copies a part or all of the information registered in the nonvolatile memory to the volatile memory at an initial stage of a camera operation and which thereafter controls the camera operation by use of the information stored in the volatile memory,
   wherein the control circuit judges, at a predetermined timing including a lens attaching operation, whether or not the specific information of the attached photographing lens has already been stored in the volatile memory, and, when the control circuit judges that the specific information has not been stored, the control circuit acquires the specific information of the attached photographing lens from the attached photographing lens to store the acquired specific information in the volatile memory, and when the control circuit judges that the specific information has been stored, the control circuit does not perform the acquisition.

2. The camera according to claim 1, wherein the control circuit registers the acquired specific information in the nonvolatile memory before termination of the camera operation.

3. A camera to which a plurality of types of photographing lenses can be detachably attached, comprising:
   a storage unit which can register one or more pieces of specific information of the photographing lenses;
   a judgment unit which judges, at a predetermined timing including a time when a photographing lens is attached, whether or not the specific information of the attached photographing lens has been registered in the storage unit;
   a registration unit which acquires the specific information of the attached photographing lens from the attached photographing lens to register the acquired specific information in the storage unit, in a case where the judgment unit judges that the specific information of the attached photographing lens is not registered in the storage unit, and does not acquire the specific information in a case where the judgment unit judges that the specific information of the attached photographing lens is registered in the storage unit; and
   a control unit which controls a camera operation in accordance with the specific information registered in the storage unit.

4. The camera according to claim 3, wherein the specific information of the photographing lens includes identification data of the photographing lens, and the judgment unit acquires the identification data from the attached photographing lens at the predetermined timing and compares the identification data with the identification data already registered in the storage unit to perform the judgment.

5. The camera according to claim 3, wherein the predetermined timing includes a time when the camera operation is started.

6. The camera according to claim 3, wherein the storage unit has a plurality of regions to register one or more pieces of the specific information of the photographing lenses.

7. The camera according to claim 6, wherein the registration unit overwrites the information of some of the plurality of regions in a case where there is no free area in the storage unit.

8. The camera according to claim 7, wherein the region in which the information is to be overwritten is determined in accordance with at least one of the number of use times of the specific information registered in the region and a registration date of the specific information.

9. A camera to which a plurality of types of photographing lenses can be detachably attached, comprising:
   a memory which can store specific information of the photographing lenses; and
   control circuit which judges, at a predetermined time including a lens attachment operation, whether or not the specific information of the attached photographing lens has already been registered in the memory and, when the control circuit judges that the specific information is not registered, acquires the specific information of the attached photographing lens from the attached photographing lens to thereafter control a camera operation based on the acquired specific information, when the control circuit judges that the specific information is registered, does not perform the acquisition.

10. The camera according to claim 9, wherein the memory includes a nonvolatile memory in which one or more pieces of the specific information of the photographing lenses can be registered and a volatile memory which is operable at a speed higher than that of the nonvolatile memory, and the control circuit copies, a part or all of contents registered in the nonvolatile memory to the volatile memory in an initial operation of the camera.

11. The camera according to claim 9, wherein the control circuit registers the information of the volatile memory in the nonvolatile memory prior to the termination of the camera operation.

12. The camera according to claim 9, wherein the specific information of the photographing lens includes identification data of the photographing lens, and the control circuit compares the identification data acquired from the attached photographing lens with the identification data already stored in the memory to thereby perform the judgment.

13. A control method of a camera to which a plurality of types of photographing lenses can be detachably attached, comprising:
    judging, at a predetermined timing including attachment operation of a photographing lens, whether or not the specific information of the attached photographing lens has already been registered in a memory of the camera;
    acquiring the specific information of the attached photographing lens from the attached photographing lens, when it is judged that the specific information of the attached photographing lens is not registered in the memory and not acquiring the specific information of the attached photographing lens from the attached photographing lens, when it is judged that the specific information of the attached photographing lens is registered in the memory; and
    registering the acquired specific information in the memory in a case where it is acquired.

14. A control method of a camera to which a plurality of types of photographing lenses can be detachably attached, comprising:
    copying, in a volatile memory, identification information and other specific information of the photographing lens registered in a nonvolatile memory at a time when the camera is initialized;
    acquiring the identification information of the attached photographing lens from the attached photographing lens in conjunction with a lens attachment operation;
    comparing the identification information acquired from the attached photographing lens with each piece of the identification information stored in the nonvolatile memory to judge whether or not both the identification data agree with each other; and
    acquiring specific information of the attached photographing lens from the attached photographing lens to store the acquired specific information in the volatile memory, in a case where as a result of the comparison, both the identification information do not agree with each other, and not acquiring specific information of the attached photographing lens from the attached photographing lens to store the acquired specific information in the volatile memory, in a case where as a result of the comparison, both the identification information agree with each other.

15. The control method of the camera according to claim 14, further comprising:
    registering the information stored in the volatile memory in the nonvolatile memory prior to the termination of the operation of the camera.

16. A camera to which a plurality of types of accessories can be detachably attached, comprising:
    a storage unit which can register one or more pieces of specific information of the accessories;
    a judgment unit which judges, at a predetermined time including a time when an accessory is attached, whether or not the specific information of the attached accessory is registered in the storage unit;
    a registration unit which acquires the specific information of the attached accessory from the attached accessory to register the acquired specific information in the storage unit, only when the judgment unit does not confirm that the specific information of the attached accessory is registered in the storage unit; and
    a control unit which controls a camera operation in accordance with the specific information registered in the storage unit.

17. A control method of a camera to which a plurality of types of accessories can be detachably attached, comprising:
    judging, at a predetermined time including a time when an accessory is attached, whether or not specific information of the attached accessory has already been registered in a memory of the camera; and
    acquiring the specific information of the attached accessory from the attached accessory, only when it is not confirmed that the specific information of the attached accessory is registered in the memory.

* * * * *